United States Patent
Tanaka et al.

(10) Patent No.: US 8,428,428 B2
(45) Date of Patent: Apr. 23, 2013

(54) REPRODUCTION DEVICE AND PROGRAM

(75) Inventors: Keiichi Tanaka, Osaka (JP); Germano Leichsenring, Osaka (JP); Hidetaka Ohto, Hyogo (JP); Tomokazu Kanamaru, Osaka (JP)

(73) Assignee: Panasonic Corporation, Osaka (JP)

( * ) Notice: Subject to any disclaimer, the term of this patent is extended or adjusted under 35 U.S.C. 154(b) by 1192 days.

(21) Appl. No.: 12/092,197

(22) PCT Filed: Oct. 3, 2006

(86) PCT No.: PCT/JP2006/319741
§ 371 (c)(1),
(2), (4) Date: Apr. 30, 2008

(87) PCT Pub. No.: WO2007/058025
PCT Pub. Date: May 24, 2007

(65) Prior Publication Data
US 2009/0269028 A1    Oct. 29, 2009

(30) Foreign Application Priority Data
Nov. 15, 2005 (JP) ................................. 2005-330642

(51) Int. Cl.
*H04N 5/85* (2006.01)
(52) U.S. Cl.
USPC ............ 386/239; 386/241; 386/248; 386/290
(58) Field of Classification Search ................... 386/239, 386/241, 248, 290
See application file for complete search history.

(56) References Cited

U.S. PATENT DOCUMENTS

| | | | |
|---|---|---|---|
| 2002/0159185 A1 | 10/2002 | Kuroiwa | |
| 2006/0062073 A1* | 3/2006 | Kitani et al. | 365/232 |
| 2006/0098936 A1 | 5/2006 | Ikeda et al. | |
| 2009/0214042 A1* | 8/2009 | Nakahara et al. | 380/278 |

FOREIGN PATENT DOCUMENTS

EP      1 553 769 A1    7/2005
(Continued)

OTHER PUBLICATIONS

Bin Zhu ; Tewfik, A.H. "Data hiding for video-in-video", Date of conference, Oct. 26-29, 1997, vol. 2, pp. 676-679 vol. 2.*

(Continued)

*Primary Examiner* — Michael Simitoski
*Assistant Examiner* — Ali Shayanfar
(74) *Attorney, Agent, or Firm* — Wenderoth, Lind & Ponack, L.L.P.

(57) ABSTRACT

A playback apparatus plays back video data recorded on a recording medium such as a BD-ROM. The playback apparatus includes (i) an interface in which a removable medium such as an SDRAM is inserted, (ii) a detection module detecting that the removable medium is inserted, and (iii) a virtual file system. The virtual file system is used if the removable medium is detected to be inserted, if additional content such as subtitles is recorded on the removable medium, and furthermore if the additional content is associated with the video data recorded on the BD-ROM, etc. The virtual file system dynamically combines the video data recorded on the BD-ROM, etc. and the additional content of the removable medium so as to play back a virtual package.

13 Claims, 28 Drawing Sheets

FOREIGN PATENT DOCUMENTS

| | | |
|---|---|---|
| EP | 1 688 950 | 8/2006 |
| EP | 2490127 A1 * | 8/2012 |
| JP | 11-164070 | 6/1999 |
| JP | 2002-247526 | 8/2002 |
| JP | 2004-240832 | 8/2004 |
| JP | 2005-159589 | 6/2005 |
| WO | 2004/030356 | 4/2004 |
| WO | 2005/086159 | 9/2005 |

OTHER PUBLICATIONS

International Search Report issued Jan. 16, 2007 in the International (PCT) Application of which the present application is the U.S. National Stage.

Supplemental European Search Report issued Jul. 28, 2011 in corresponding European Application No. 06811089.9.

* cited by examiner

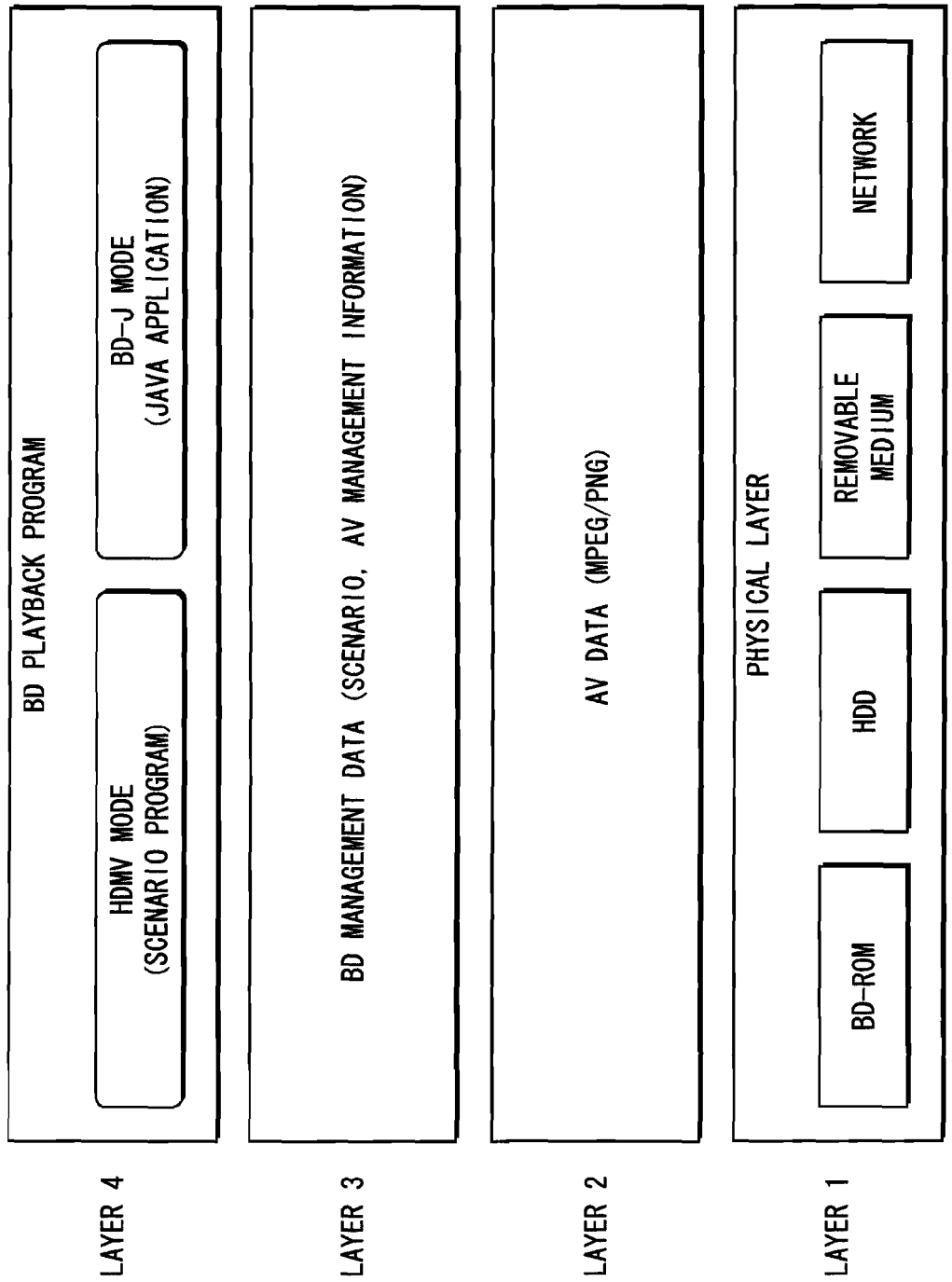

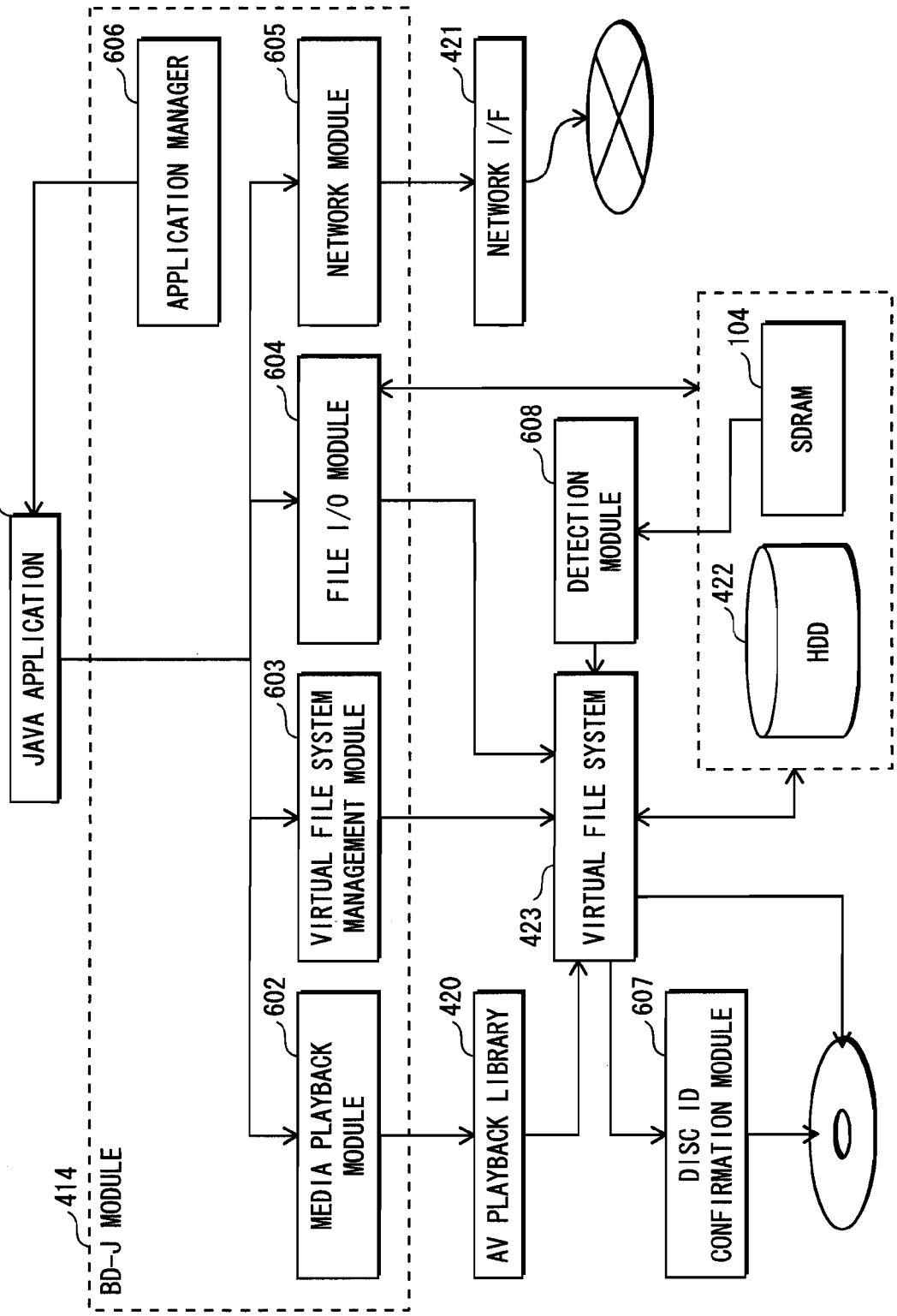

REPRODUCTION DEVICE AND PROGRAM

TECHNICAL FIELD

The present invention relates to a playback apparatus that plays back video data recorded on a recording medium such as a BD-ROM (Blu-Ray Disc Read Only Memory), and in particular to a technology for playing back a single package (hereinafter referred to as a "virtual package") made by dynamically combining video data recorded on the recording medium and video data, etc. recorded on another recording medium.

BACKGROUND ART

In recent years, playback apparatuses for playing back video content such as a movie (hereinafter referred to as a "BD package") recorded on a recording medium such as a BD-ROM have become common.

Patent documents 1 and 2 below disclose technology for connecting the playback apparatus to the Internet, downloading additional content not included in the BD package, such as subtitles and previews of new films, recording the additional content on the local storage of the playback apparatus, and playing back a virtual package made up of the BD package and the additional content. Also, patent document 1 teaches that the technology is also applicable when a recording medium such as an SD memory card is used instead of the local storage.

According to the above technology, by downloading the additional content and playing back the virtual package, the user can play back the BD package that has been updated with the additional content as if both the BD package and the additional content originated as a single package.

Patent document 1: International Publication No. WO 2004/030356

Patent document 2: Japanese Patent Application Publication No. 2005-159589

DISCLOSURE OF THE INVENTION

Problems Solved by the Invention

The use modes of this technology are anticipated to include not only connecting the playback apparatus to the Internet and downloading additional content as in the above patent documents, but also downloading additional content to an SD memory card or the like with use of a device other than the playback device such as a personal computer, inserting the SD memory card in the playback apparatus and playing back the virtual package.

Particularly in this use mode, the user is anticipated to insert an SD memory card, etc. that has additional content recorded thereon when playing back the BD package, and there is a desire to be able to play back the virtual package appropriately in this situation.

The present invention was achieved in view of the above problem, and an aim thereof is to provide a playback apparatus that can play back a virtual package with use of a removable recording medium such as an SD memory card, when the removable recording medium is inserted during playback of video data recorded on another recording medium such as a BD-ROM.

Means to Solve the Problems

The playback apparatus of the present invention plays back video data, with use of basic information for controlling playback of the video data, from a first recording medium on which the video data and the basic information are recorded, the playback apparatus including an interface in which a second recording medium can be inserted and from which the second recording medium can be removed; a detection unit operable to detect that the second recording medium is inserted in the interface; and a playback control unit operable to control playback of the video data, wherein if the detection unit detects that the second recording medium is inserted in the interface during playback of the video data recorded on the first recording medium, and furthermore if supplementary information for controlling playback of the video data is recorded on the second recording medium, the playback control unit judges whether the supplementary information is associated with the basic information, if the supplementary information is judged to be associated with the basic information, the playback control unit changes an attribute of the supplementary information to read-only, and performs signature verification on the supplementary information with use of certificate data recorded on the first recording medium and signature information recorded on the second recording medium, and if the supplementary information is judged to be authentic as a result of the signature verification, after stopping playback of the video data with use of the basic information, the playback control unit performs control to play back the video data with use of the basic information on the first recording medium and the supplementary information on the second recording medium.

Here, basic information is information that defines file organization for playing back video data files, and includes playlists, management information, applications, etc. for playing back video data recorded on the first recording medium. Supplementary information includes video data files, applications, etc. that can be dynamically combined with the video data on the first recording medium and played back or executed, and is information that defines file organization so that a virtual package dynamically combined from the video data pieces of the first recording medium can be played back.

Also, playback of the video data with use of the supplementary information means that files such as video data and applications included in the supplementary information on the second recording medium are dynamically combined with the video data files on the first recording medium to create a single virtual package, and the virtual package is played back.

Effects of the Invention

According to the above structure, since the playback apparatus pertaining to the present invention detects when a second recording medium is inserted in the playback apparatus, if supplementary information for playing back a virtual package of video data from the first recording medium has been recorded on the second recording medium, the playback apparatus can play back the virtual package with use of the second recording medium, even if the second recording medium is inserted during playback of the video data recorded on the first recording medium which is a BD-ROM or the like.

Also, the playback apparatus may further include a reception unit operable to receive, from a user, a selection of whether to use the second recording medium when playing back the video data if the detection unit detects that the second recording medium is inserted in the interface, wherein the playback control unit may perform playback control to play back the video data with use of the supplementary information only if the reception unit has received a selection to use the second recording medium.

Here, using the supplementary information on the second recording medium when playing back the video data means playing back a virtual package of video data of the first recording medium with use of the supplementary information on the second recording medium.

According to this structure, since a selection can be received from the user indicating whether to play back the virtual package with use of the second recording medium if the second recording medium is inserted by the user before or during playback of the video data, playback control can be performed in accordance with the intention of the user.

Also, in the playback apparatus, before playing back the video data with use of the basic information and the supplementary information, the playback control unit may further judge whether the supplementary information is associated with the basic information, and only if the supplementary information is judged to be associated with the basic information, the playback control unit may perform control to play back the video data with use of the supplementary information.

Here, the supplementary information being associated with the basic information means that the supplementary information can be combined with the basic information, and a virtual package can be played back with use of the supplementary information.

According to this structure, since before playback with use of the supplementary information on the second recording medium, a judgment can be made whether the supplementary information is associated with the basic information, for example, if information indicating whether the supplementary information is associated with the basic information is shown on a display, the user can confirm whether the virtual package can be played back with use of the second recording medium inserted in the interface.

Also, in the playback apparatus, if signature information for performing signature verification on the supplementary information has been recorded on the second recording medium, and the supplementary information is judged to be associated with the basic information, the playback control unit may further perform signature verification of the supplementary information with use of the signature information, and only if the supplementary information is judged to be authentic as a result of the signature verification, the playback control unit may perform control to play back the video data with use of the supplementary information.

According to this structure, since the video data is played back with use of the supplementary information on the second recording medium only if the supplementary information is associated with the basic information and the supplementary information has been distributed by an authorized provider, this structure enables preventing playback of a virtual package not intended by the authorized provider using supplementary information distributed by an unauthorized provider.

Also, in the playback apparatus, if the detection unit detects that the second recording medium is inserted during playback of the video data, and the reception unit receives the selection to use the second recording medium, if the supplementary information is judged to be associated with the basic information, and the supplementary information is judged to be authentic as a result of the signature verification, after playback of the video data has ended, the playback control unit may perform control to play back the video data with use of the supplementary information, if the supplementary information is not judged to be associated with the basic information, the playback control unit may continue playing back the video data, and if the supplementary information is not judged to be authentic as the result of the signature verification, the playback control unit may continue playing back the video data.

According to this structure, if the second recording medium can be used to play back a virtual package according to the judgment and the signature verification result, the user can insert a second recording medium into the interface while the video data of the first recording medium is being played back. The user can start the playback of the virtual package created with use of the second recording medium by performing a selection to use the second recording medium when playing back the virtual package. Also, even when the second recording medium cannot be used when playing back the virtual package, the user can continue viewing the video data currently being played back.

Also, in the playback apparatus, if the detection unit detects that the second recording medium is inserted during playback of the video data, and if the reception unit receives the selection to use the second recording medium, the playback control unit may continue playing back the video data, and only if the supplementary information is judged to be associated with the basic information and the supplementary information is judged to be authentic as the result of the signature verification, the playback control unit may perform control to play back the video data at a predetermined timing with use of the supplementary information recorded on the second recording medium.

Here, when a playback segment of the video data on the first recording medium to be provided to the user has been specified in advance, the predetermined timing is the time of an operation by the user to switch the playback segment of the video data targeted for playback, or the time that the playback segment of the video data targeted for playback is switched by an application.

According to this structure, the supplementary information on the second recording medium can be used when playing back the virtual package in accordance with the judgment and the signature verification result, and if a selection is performed by the user to use the second recording medium for playing back the virtual package, even if the user inserts the second recording medium in the interface during playback of the video data on the first recording medium, playback of the video data that is being played back continues, for example until the user performs an operation to switch the playback segment of the video data targeted by playback. Therefore, the user can continue viewing the video data being played back without interruption, and after playback has ended, the user can view the virtual package.

Also, the playback apparatus may further include a reporting unit operable to report information indicating whether, in accordance with the result of the judgment of the playback control unit and the result of the signature verification, the video data can be played back with use of the supplementary information recorded on the second recording medium.

According to this structure, since information indicating whether the second recording medium can be used to play back the virtual package, according to the judgment and the signature verification result, can be reported to the user by being shown on a display, for example, the user can confirm whether the virtual package can be played back with use of the inserted second recording medium.

Also, in the playback apparatus, the detection unit may be further operable to detect that the second recording medium is removed from the interface, and while the playback control unit is performing control to play back the video data with use of the supplementary information recorded on the second recording medium, after the detection unit has detected that the second recording medium is removed, if the detection unit detects that the second recording medium has been inserted in the interface again, the playback control unit may perform control to restart playback of the video data with use of the supplementary information.

According to this structure, while a virtual package is being played back with use of the second recording medium, even if the user has removed the second recording medium from the interface, if the second recording medium is inserted in the interface again, playback of the virtual package with use of the second recording medium can continue.

Also, the playback apparatus may further include an instruction reception unit operable, if the detection unit detects that the second recording medium has been removed from the interface during playback of the video data with use of the supplementary information, to report that the second recording medium has been removed, and to receive an instruction of whether to use the second recording medium when playing back the video data, wherein if the instruction reception unit receives an instruction to use the second recording medium, the playback control unit may further restart playback of the video data with use of the supplementary information, and if an instruction not to use the second recording medium is received, the playback control unit may further end playback of the video data with use of the supplementary data.

According to this structure, if the user removes the second recording medium from the interface while the virtual package is being played back with use of the second recording medium, the user can confirm that the second recording medium has been removed, and furthermore can indicate whether to use the second recording medium for playing back the video data after the removal.

Also, since the playback control unit restarts playback of the virtual package not only according to the reinsertion of the second recording medium in the interface by the user, but also according to an instruction indicating whether to use the second recording medium when playing back the video data, playback control can be performed in accordance with the intention of the user.

Also, in the playback apparatus, after the detection unit has detected that the second recording medium has been removed, if the detection unit has not detected that the second recording medium has been inserted in the interface again in a predetermined time period, the playback control unit may end playback of the video data with use of the supplementary information, and restart playback if the detection unit detects that the second recording medium has been inserted again.

According to this structure, since the playback control unit performs playback control according to whether the detection unit detects insertion of the second recording medium in a predetermined time period, playback control can be performed appropriately and malfunctions can be prevented even when the second recording medium is removed during playback of the virtual package with use of the second recording medium and the time of reinserting the second recording medium is delayed for a certain length of time.

Also, the playback apparatus may further include a third recording medium operable to record the supplementary information for controlling playback of the video data; and a selection reception unit operable to receive, from the user, a selection of whether to use the third recording medium or the second recording medium if the detection unit has detected that the second recording medium is inserted in the interface, wherein if the selection reception unit has received a selection to use the second recording medium, the playback control unit may further perform playback control to play back the video data with use of the supplementary information recorded on the second recording medium.

According to this structure, if a third recording medium that stores supplementary information is provided in the playback apparatus, and the user inserts the second recording medium in the interface, the user can select which recording medium to use when playing back the virtual package. Therefore, for example, when there are different versions of supplementary information stored on each of the second recording medium and the third recording medium, the virtual package can be played back with use of the version intended by the user.

Also, in the playback apparatus, if the second recording medium is not inserted in the interface, the playback control unit may further perform control to play back the video data with use of the supplementary information recorded on the third recording medium and the basic information, in a case that playback control of the video data is being performed with use of the supplementary information recorded on the third recording medium, the selection reception unit has received a selection to use the second recording medium, and signature information for verifying the authenticity of the supplementary information has been stored on the second recording medium, if the supplementary information recorded on the second recording medium is associated with the basic information, and the supplementary information is judged to be authentic as a result of a signature verification of the supplementary information, the playback control unit may perform control to play back the video data with use of the supplementary information recorded on the second recording medium, if the supplementary information recorded on the second recording medium is not in association with the basic information, the playback control unit may perform control to continue the playback with use of the third recording medium, and if the supplementary information is not judged to be authentic as a result of the signature verification, the playback control unit may perform control to continue the playback with use of the third recording medium.

According to this structure, provided that the virtual package can be played back with use of supplementary information recorded on the second recording medium according to the judgment and the signature verification, even if the virtual package is currently being played back with use of the third recording medium, if the user wishes to start playback of the virtual package with use of the second recording medium, the user can do so by inserting the second recording medium in the interface and performing an operation to select the second recording medium. Also, even if the virtual package cannot be played back with use of the supplementary information recorded on the second recording medium according to the judgment and the signature verification, the user can still continue viewing the virtual package with use of the third recording medium.

Also, the playback apparatus may further include a media detection unit operable to detect that the second recording medium is inserted in the interface, wherein if the second recording medium is not inserted in the interface, the playback control unit may further perform control to play back the video data with use of the supplementary information recorded on the third recording medium and the basic information, the selection reception unit receives the selection after the media detection unit has detected that the second recording medium is inserted, in a case that playback control of the video data is being performed with use of the supplementary information recorded on the third recording medium, and the selection reception unit has received a selection to use the second recording medium, the playback control unit may continue playback control with use of the supplementary information recorded on the third recording medium, if the supplementary information is associated with the basic information, signature information for verifying the authenticity of the supplementary information has been stored on the second recording medium, and the supplementary information is judged to be authentic as a result of a signature verification of the supplementary information performed with use of the signature information, the playback control unit may perform control to play back the video data with use of the supplementary information recorded on the second recording medium at a predetermined timing.

According to this structure, if the second recording medium can be used when playing back the virtual package according to the judgment and the signature verification result, and a selection to use the second recording medium when playing back the virtual package has been performed, even if a virtual package is currently being played with use of the third recording medium, if the second recording medium is inserted in the interface, the user can continue to view the video data currently being played until the user performs an operation to switch the video data that is targeted for playback. Also, after the playback has finished, the user can view the video data in the virtual package when playing back the next playback segment of video data.

Also, the playback apparatus may further include an acquisition unit operable, if the detection unit has detected that the second recording medium is inserted in the interface, to acquire supplementary information from an external device and store the acquired supplementary information recorded on the second recording medium.

According to this structure, even if a hard disk is not provided in the playback apparatus, if the second recording medium is inserted in the interface, supplementary information can be obtained from an outside source via a network such as the Internet.

BRIEF DESCRIPTION OF THE DRAWINGS

FIG. 3 shows a layer model of software that targets the BD-ROM pertaining to the embodiment;

FIG. 6 is a schematic diagram of a BD-J module of the playback apparatus pertaining to the present invention;

Figure 1:
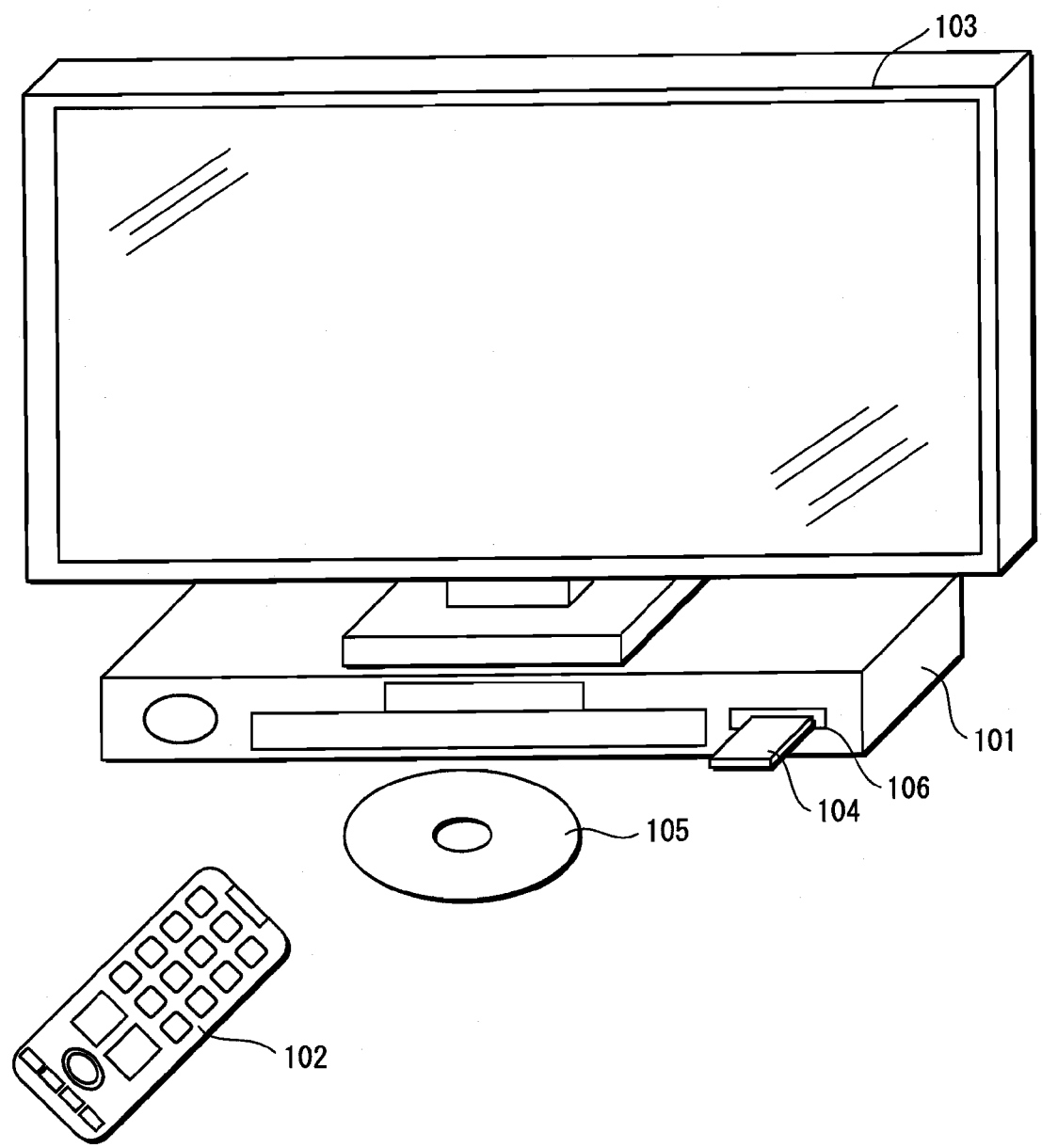
FIG. 1 shows an exemplary playback apparatus pertaining to the embodiment and a use mode thereof.

DESCRIPTION OF THE CHARACTERS 101 playback apparatus
102 remote control
103 display
104 SDRAM
105 BD-ROM
106 insertion slot
413 HDMV module
414 BD-J module
415 UO detection module
416 mode management module
417 dispatcher
421 network I/F
423 virtual file system
601 Java (registered trademark) application
607 DiskID confirmation module
608 detection module

BEST MODE FOR CARRYING OUT THE INVENTION

Embodiment 1

FIG. 1 shows an exemplary playback apparatus pertaining to the embodiment and a use mode thereof.

In FIG. 1, a playback apparatus 101 includes a local storage (HDD) of which the interior is not depicted and an insertion slot 106 for a removable medium such as a Memory Stick (registered trademark), a CompactFlash (registered trademark), a SmartMedia (registered trademark), or a MultiMedia Card (registered trademark).

The playback apparatus 101 performs playback of video data such as a movie recorded on a BD-ROM 105, according to an operation performed by a user on a home theater system formed from, for example, a remote control 102 and a display 103, via the remote control 102, and displays the video that is played back on the display 103. Note that the removable medium described in the embodiment is an SDRAM (Synchronous DRAM).

Overview

If an SDRAM 104 is inserted into the insertion slot 106 by a user before or during playback of the BD-ROM 105, the playback apparatus 101 pertaining to the embodiment receives a selection from the user indicating whether to use the SDRAM 104 when playing back the BD-ROM 105.

If the playback apparatus 101 receives a selection to use the SDRAM 104 from the user, when performing control to play back the BD-ROM 105, the playback apparatus 101 activates file access to the SDRAM 104 and judges whether a virtual package of the BD-ROM 105 can be constructed with use of the SDRAM 104. If a judgment is made that the virtual package can be constructed, the virtual package is constructed with use of the video data stored on the SDRAM 104 that is inserted and the video data stored on the BD-ROM 105.

Note that as described above, the virtual package is content made up of video data recorded on the BD-ROM 105 (hereinafter referred to as a "BD package") and additional content made up of secondary audio, subtitles, special feature videos, applications, etc. that are recorded on a HDD 422 or the SDRAM 104 and are not recorded in the BD package, and the video data and the additional content are played back as if recorded as a single package. Also, constructing the virtual package refers to a process of merging directories and files on the BD-ROM 105 and the HDD 422 or the SDRAM 104 to form a single hierarchical directory structure according to the merge management information described later, so that the applications on the BD-ROM 105, the HDD 422 and the SDRAM 104 can read data from, and write data to, files in the hierarchical directory structure. Note that the virtual package that is constructed refers only to the hierarchical directory structure, and each piece of file data in the virtual package remains on the BD-ROM 105, the HDD 422, or the SDRAM 104, respectively.

Before constructing the virtual package, the user, for example, performs an operation to acquire the additional content by connecting the playback apparatus 101, a personal computer, or the like to the provider of the additional content on the Internet, and downloading the additional content to the HDD 422 or the SDRAM 104. Also, a merge management information file that specifies how to merge the BD package and the files of additional content to construct the virtual package, and a signature information file for verifying the authenticity of the merge management information, are obtained when the additional content is downloaded.

In the description of the present embodiment, the additional content has already been downloaded before playback of the BD-ROM 105.

Structure of the BD-ROM 105

Figure 2:
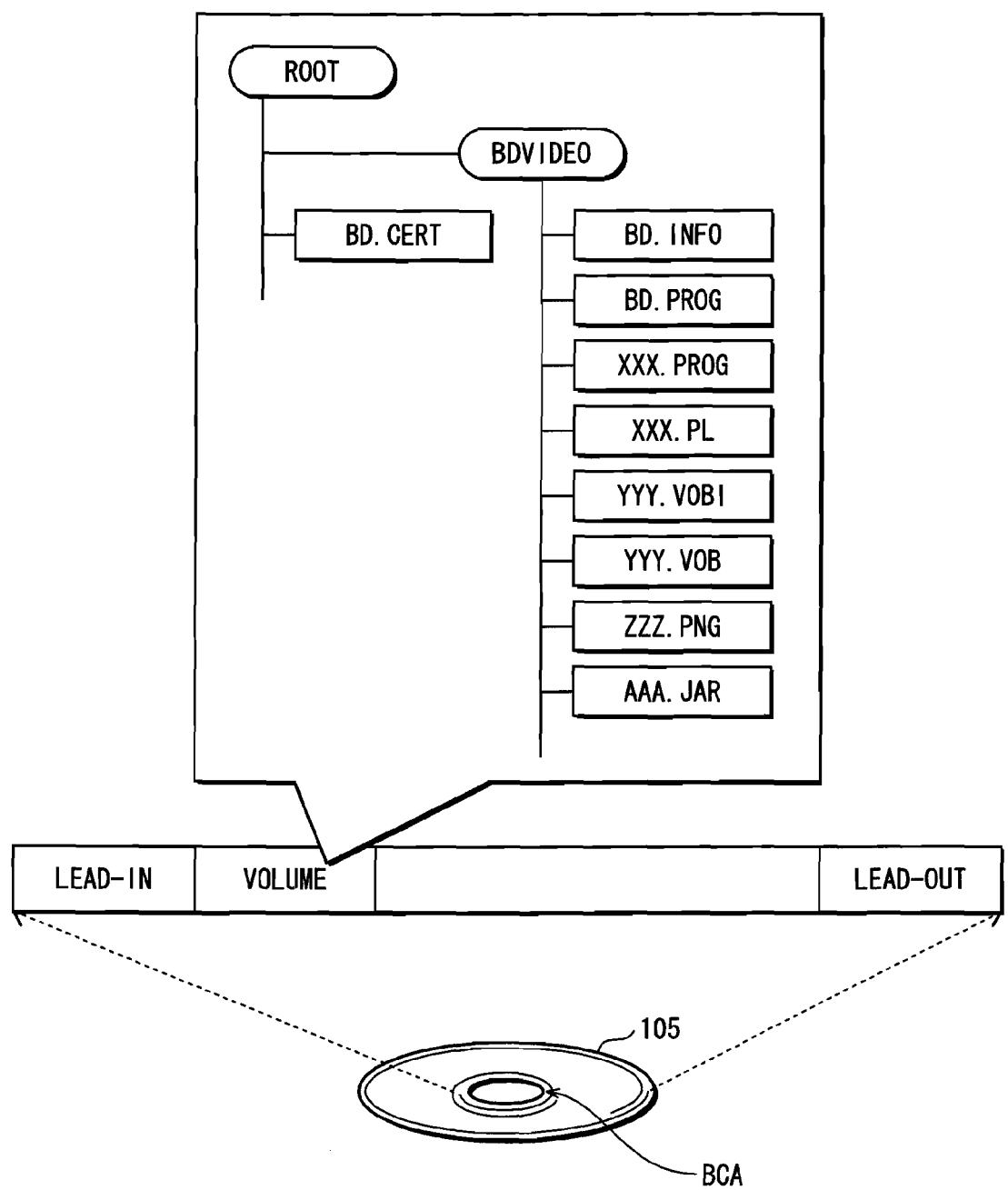
FIG. 2 shows a structure of a BD-ROM pertaining to the embodiment.

FIG. 2 shows a structure of the BD-ROM 105 that is played back by the playback apparatus 101.

Although the present embodiment mainly describes the BD-ROM 105 as storing an AV application for playing back AV content such as movies, etc., of course the BD-ROM can also be used as a recording medium for a computer, in the same way as a CD-ROM (Computer Disk Read Only Memory) or a DVD-ROM (Digital Versatile Disk Read Only Memory).

Similarly to other optical disks, such as DVDs and CDs, the BD-ROM 105 has a recording area that extends from the inner circumference to the outer circumference in a spiral shape, and between a lead-in on the inner circumference and a lead-out on the outer circumference, there is a logical address space in which logical data can be recorded. Also, on the inner side of the lead-in, there is a particular area called a BCA (Burst Cutting Area) that can only be read by a drive. Since the area cannot be read by applications, the area can be used for copyright protection technology, etc.

In the logical address space, application data such as video data is recorded, beginning with file system information (volume).

The file system is UDF (Universal Disk Format) or ISO 9660, etc., and similarly to a personal computer, the file system can use the directory and file structure to read the logical data recorded on the BD-ROM 105.

The following describes the directory and file structure of the BD-ROM 105.

In the present embodiment, the directory and file system on the BD-ROM 105 includes a root directory (ROOT) and a BDVIDEO directory directly thereunder. The BD directory is the directory in which AV content, management information, etc. handled with use of BD are recorded.

The following describes files recorded in the BDVIDEO directory of FIG. 2 and BD.CERT files.

BD.INFO (a fixed file name) is one type of "BD management information" in which information pertaining to the entire BD disk is recorded, and this information is read first when the playback apparatus 101 begins BD playback.

BD.PROG (a fixed file name) is one type of "BD playback program", in which a program pertaining to the entire BD disk is recorded.

XXX.PL ("XXX" is variable, and the extension "PL" is fixed) is a type of "BD management information", and is a file in which playlist information of recorded scenarios is recorded. A separate file is stored for each playlist.

XXX.PROG ("XXX" is variable, and the extension "PROG" is fixed) is a type of "BD playback program", in which a separate program is recorded for each playlist. The corresponding playlist is identified by a file body name (corresponding to "XXX").

YYY.VOB ("YYY" is variable, and the extension "VOB" is fixed) is a file of "AV data", in which an MPEG stream that is AV data is recorded. A separate file is stored for each VOB.

YYY.VOBI ("YYY" is variable, and the extension "VOBI" is fixed) is a file of "BD management information", in which is recorded management information pertaining to the VOB that is AV data. The corresponding VOB is identified by a file body name (corresponding to "YYY").

ZZZ.PNG is "AV data" ("ZZZ" is variable, and the extension "PNG" is fixed), and is a file in which image data PNG (an image format standardized by W3C), for constructing subtitles and menus, has been recorded. A separate file is stored for each PNG image.

AAA.JAR ("AAA" is variable, and the extension "JAR" is fixed) has recorded therein a Java (registered trademark) program for performing dynamic scenario control with use of a Java (registered trademark) virtual machine.

The AAA.JAR file is necessary for controlling playback of titles indicating playback segments of content on the BD-ROM 105 from a Java (registered trademark) program. Note that the titles indicating playback segments are, for example, menu displays of the BD-ROM 105 and game applications, etc., and the particulars of the titles are described later.

BD.CERT (fixed file name) is a certificate (hereinafter referred to as a "merge certificate") for verifying whether a merge management file is authentic, and is used when merging the additional content with the data on the BD-ROM 105 to construct the virtual package.

Playback Control of the BD-ROM 105

Next, a layer model that illustrates how the playback apparatus 101 performs playback control on the BD-ROM 105 is described with reference to FIG. 3.

Layer 1 of FIG. 3 is a physical layer, and supplies an AV stream targeted for playback control. As shown in layer 1, the AV stream targeted for playback control uses various types of recording medium and communication medium as supply sources. These include not only the BD-ROM 105, but also the HDD 422 that is a recording medium that has been implemented in the playback apparatus 101 in advance, a removable medium such as SDRAM, and a network.

Layer 1 performs control such as disk access, card access, and network communication on the supply sources such as the HDD 422, the removable medium, and the network.

Layer 2 is an AV data layer that specifies which type of decoding method to use to decode the AV stream supplied by layer 1.

Layer 3 (BD management information) is a layer that specifies a static scenario of the stream. A static scenario is playback route information and stream management information specified in advance by a disk manufacturer. Layer 3 specifies playback control according to these pieces of information.

Layer 4 (BD playback program) is a layer that realizes a dynamic scenario in the AV stream. A dynamic scenario is a program that executes at least one type of procedure, the types being procedures for playing back the AV stream, and procedures for controlling playback.

Playback control of the dynamic scenario changes according to operations of the user, and is reprogrammable. Here, there are two modes of dynamic playback control. One is a playback mode that plays back video data recorded on the BD-ROM 105 in an environment specific to AV equipment (HDMV mode). The other is a mode that raises the added value of the video data recorded on the BD-ROM 105 (BD-J mode).

Layer 4 describes the two modes, HDMV mode and BD-J mode. HDMV mode is a mode in which playback is performed in a playback environment similar to DVD. A scenario program operating in HDMV mode describes a scenario for dynamically changing the playback progress. BD-J mode is a mode for performing playback using a Java (registered trademark) virtual machine as a main constituent, and performing playback control from a Java application.

Figure 4A:
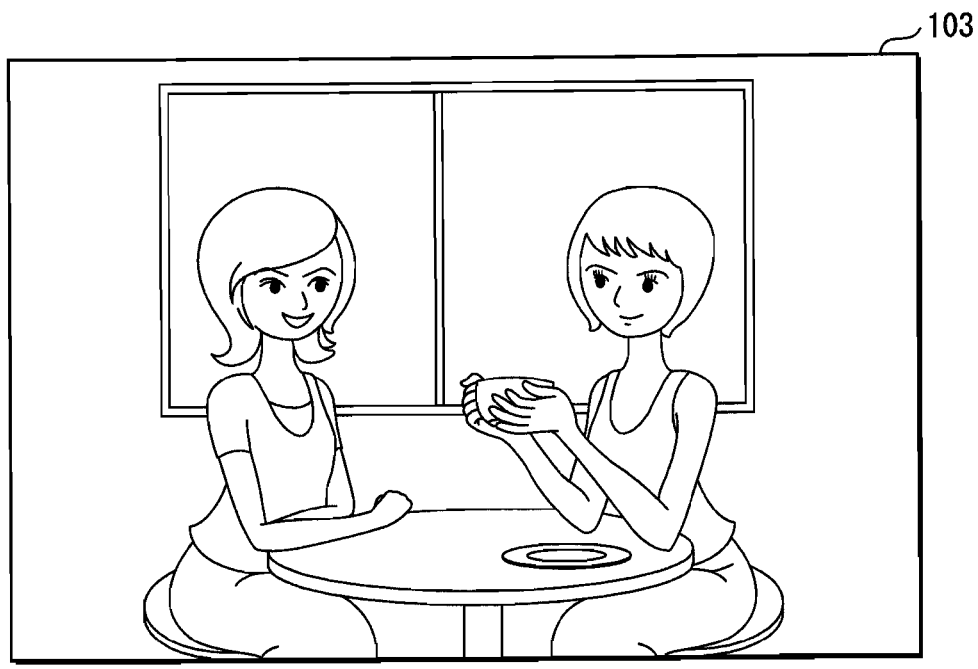
FIG. 4A shows an exemplary image displayed by playback control in HDMV mode.
Figure 4B:
FIG. 4B shows an exemplary image displayed by playback control in BD-J mode.

FIGS. 4A and 4B show exemplary displays of a video being played back with use of dynamic playback control in each of the two modes.

FIG. 4A shows an exemplary image displayed by dynamic playback control defined in HDMV mode. Since commands used in HDMV mode are similar to commands that can be interpreted by a DVD playback apparatus, playback control can be defined similarly to DVD, specifically, content can be played back in accordance with a selection of the user from a menu.

FIG. 4B shows an exemplary image displayed by dynamic playback control defined in BD-J mode. A control procedure can be described in BD-J mode with use of Java language that can be interpreted by a Java virtual machine.

For example, as shown in FIG. 4B, when operation of computer graphics (CG) is controlled with use of this type of playback control, playback can be defined so that a CG image 62 representing a dolphin moves around on one side of the position where a video image 61 is displayed.

Structure

Figure 5:
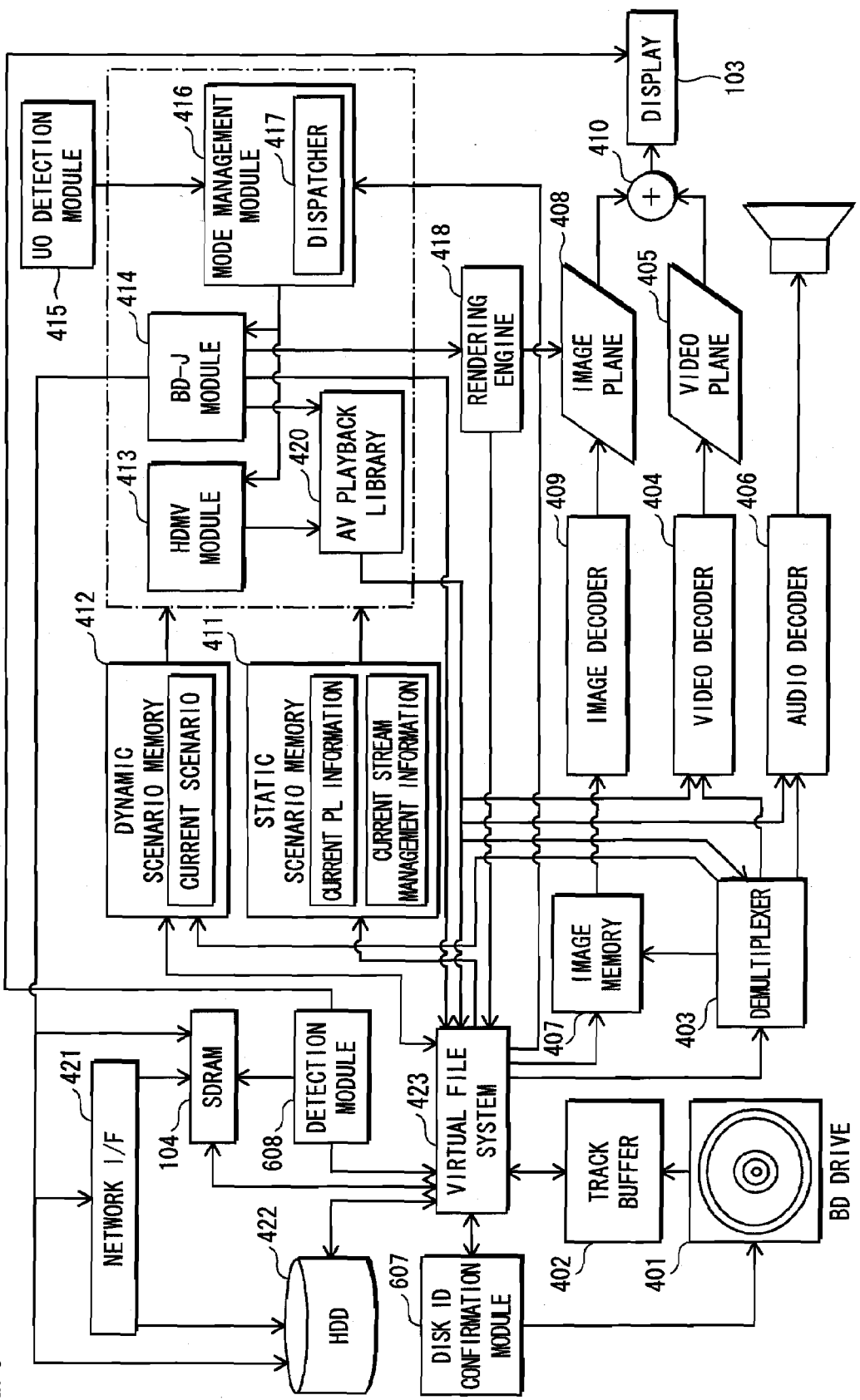
FIG. 5 is a schematic diagram of the playback apparatus pertaining to the present invention.

FIG. 5 shows a schematic diagram of the playback apparatus 101 pertaining to the present invention.

As shown in FIG. 5, the playback apparatus 101 is constituted from a BD-ROM drive 401, a track buffer 402, a demultiplexer 403, a video decoder 404, a video plane 405, an audio decoder 406, an image memory 407, an image plane 408, an image decoder 409, an adder 410, a static scenario memory 411, a dynamic scenario memory 412, an HDMV module 413, a BD-J module 414, a UO detection module 415, a mode management module 416, a dispatcher 417, a rendering engine 418, the SDRAM 104, an AV playback library 420, a network interface 421, the HDD 422, a virtual file system 423, a DiskID confirmation module 607, and a detection module 608.

The following describes functions of the constituent elements in detail.

The BD-ROM drive 401 is for loading, ejecting, and accessing the BD-ROM 105.

The track buffer 402 is realized by a FIFO memory, and stores the ACCESS UNIT read from the BD-ROM 105 by the BD-ROM drive 401 with use of a first-in first-out method.

Here, the ACCESS UNIT is a minimum decoding unit including one GOP (Group of Pictures) and an audio frame to be read at the same time as the GOP. There is a one-to-one correspondence between an ACCESS UNIT of an AV stream in the BD package and an ACCESS UNIT of an AV stream in the additional content. Note that the GOP includes a B picture that is compressed with use of a time correlation characteristic in relation to the preceding and following pictures, a P picture that is compressed with use of a time correlation characteristic in relation to the preceding picture, and an I picture that does not use a time correlation characteristic, and is compressed with use of a spacial frequency characteristic in a single frame image.

The demultiplexer 403 demultiplexes a transport stream saved on the BD-ROM 105 that is loaded in the BD-ROM drive 401, or the HDD 422 and the SDRAM 104, and extracts video frames and audio frames that constitute the GOP.

Also, the demultiplexer 403 outputs the extracted video frames to the video decoder 404, outputs the extracted audio frames to the audio decoder 406, stores a secondary video stream of subtitles, etc. in the image memory 407, and stores Navigation Button information in the dynamic scenario memory 412. Note that demultiplexing by the demultiplexer 403 includes processing to convert a TS packet to a PES packet.

When the TS packet is demultiplexed by the demultiplexer 403, the PES packet is extracted from the TS packet that constitutes the AV stream read from the BD-ROM 105 drive according to a time stamp attached to the TS packet and a clock in the playback apparatus 101. Main body data, including the video frames and the audio frames, is also extracted, and the PES packet and the main body data are output to the video decoder 404, the audio decoder 406, and the image memory 407.

Also, although the demultiplexing of the AV stream of the additional content read from the HDD 422 and the SDRAM 104 by the demultiplexer 403 is similar to the demultiplexing described above, if the time stamp attached to the TS packet of the BD package is different from the time stamp attached to the AV stream of the additional content, the demultiplexing is performed with reference to a synchronous offset included in advance in the stream management information. Note that the synchronous offset is an offset for synchronizing the AV stream of the BD package and the AV stream of the additional content, and demultiplexing is performed on the AV stream of the additional content when the time indicated by the clock reaches the time corresponding to the sum of the offset and the time indicated by the time stamp of the TS packet.

The video decoder 404 decodes the video frames output by the demultiplexer 403, and writes the decoded pictures to the video plane 405.

The video plane 405 is a memory that stores uncompressed pictures.

The audio decoder 406 decodes the audio frames output by the demultiplexer 403, and outputs the decoded audio data.

The image memory 407 is a buffer that stores the secondary video stream read from the demultiplexer 403, PNG data in the Navigation Button information, and image files read from the BD-ROM 105, the SDRAM 104, and the HDD 422 via the virtual file system 423.

The image plane 408 is a memory that has one screen worth of area, and holds the expanded secondary video data stream, the PNG data, and the image files.

The image decoder 409 expands the secondary video stream, the PNG data, and the image files stored in an image memory 7, and writes the secondary video stream, the PNG data, and the image files to the image plane 408. Decoding the secondary video stream by the image decoder 409 enables displaying various menus and the secondary video stream of the BD-ROM 105 on the screen.

The adder 410 composites images expanded by the image plane 408 with the uncompressed picture data stored in the video plane 405, and outputs a composited image. The image shown in FIG. 4B has been displayed by compositing the image in the image plane 408 and the picture in the video plane 405 with use of the adder 410.

The static scenario memory 411 is a memory for storing a current PL or current stream management information.

Note that the stream management information includes information indicating a stream encoding method of a VOB file, a frame rate, a bit rate, a resolution, etc., corresponding to each MPEG stream.

Also, the current PL is the playlist currently targeted for playback, out of a plurality of playlists recorded on the BD-ROM 105, the HDD 422, and the SDRAM 104. Also, the current stream management information is the stream management information currently targeted for playback, out of a plurality of pieces of stream management information recorded on the BD-ROM 105, the HDD 422, and the SDRAM 104.

The dynamic scenario memory 412 is a memory that stores a current dynamic scenario, and is used when the HDMV module 413 and the BD-J module 414 perform processing.

Here, the current dynamic scenario is the scenario currently targeted for execution out of a plurality of scenarios recorded on the BD-ROM 105, the HDD 422, and the SDRAM 104.

The HDMV module 413 is the main executor in HDMV mode, and executes the current scenario program read by the dynamic scenario memory 412.

The BD-J module 414 is a Java platform, and includes a Java virtual machine, a configuration, and a profile. The BD-J module 414 generates and executes a current Java object from a Java class file written to the dynamic scenario memory 412. Note that the Java platform includes a CPU, and the Java virtual machine sequentially interprets a Java object written in Java language and converts the Java object into native code that can be executed by a CPU, and the CPU executes the native code.

In accordance with an instruction from the virtual file system 423, the DiskID confirmation module 607 reads a DiskID that identifies the BD-ROM 105 from the BD-ROM 105 inserted in the BD drive 401, and sends a value of the read DiskID to the virtual file system 423.

The detection module 608 detects insertion and removal of the SDRAM 104, sends the detection result to the virtual file system 423, generates a media selection image for receiving a selection from the user of whether to use the HDD 422 or the SDRAM 104 when playing back the BD-ROM 105, and displays the media selection image on the display 103.

Also, when the SDRAM 104 has been removed, the detection module 608 transmits information indicating that the SDRAM 104 has been removed to the virtual file system 423, receives information from the virtual file system 423 indicating whether the virtual package is being played back, generates an image for allowing the user to select whether to continue playback of the virtual package with use of the SDRAM 104, and displays the image on the display 103.

Note that using the SDRAM 104 when playing back the BD-ROM 105 means that if additional content is recorded on the SDRAM 104, the virtual package is played back with use of the BD package and the additional content. Also, if the SDRAM 104 includes a download program for downloading additional content to be inserted into the BD package, the download program is executed during playback of the BD-ROM 105, additional content is downloaded, the downloaded additional content is recorded on the SDRAM 104, and the SDRAM 104 is used when the BD package is played back.

FIG. 7 shows a specific structure of a BD-J module.

The following describes the constituents thereof.

The BD-J module 414 includes a media playback module 602, a virtual file system management module 603, a file I/O module 604, a network module 605, and an application manager 606.

The media playback module 602 provides an API for controlling playback of the media of the HDD 422 or the SDRAM 104 to a Java application 601. When the Java application 601 invokes the API for controlling playback of the media, the media playback module 602 invokes a function of a corresponding AV playback library 420, and performs AV playback control.

The virtual file system management module 603 receives a virtual package construction request from the Java application 601, and transmits the content of the request to the virtual file system 423.

Note that in the present embodiment, when the SDRAM is inserted or removed and the user has performed a selection to use the SDRAM 104, the virtual package is constructed by performing virtual package construction judgment processing, described later, and if playback processing of the virtual package is included in the Java program, there are cases when a virtual package is constructed by a virtual package construction request from the Java application 601. The latter case is described after the present embodiment.

The file I/O module 604 receives an access request from the Java application 601 to access the HDD 422 or the SDRAM 104, and accesses the HDD 422 or the SDRAM 104.

Specifically, for example, the file I/O module 604 performs processing such as, upon receiving the access request from the Java application 601, reading data from the HDD 422 or the SDRAM 104, writing data to the HDD 422 or the SDRAM 104, and if a download program for additional content is included in the Java program, recording additional content files to the HDD 422 or the SDRAM 104 upon execution of the program by the Java application 601. Also, the file I/O module 604 deletes unnecessary additional content files and edits additional content files directly. However, since access to the virtual package is read-only, the file I/O module 604 cannot write to the virtual package.

The network module 605 provides an API for network control to the Java application 601. Also, upon receiving a network control request from the Java application 601 requesting searching for additional content available on the Internet and downloading the additional content, etc., the network module 605 performs network control functions such as connecting to the Internet via the network interface 421 and downloading the additional content.

The application manager 606 manages starting up and shutting down Java applications in accordance with the application management information recorded on the BD-ROM 105. Also, the application manager 606 receives an event of information indicating a user operation (hereinafter referred to as "UO" (User Operation)) transmitted from the dispatcher 417, and transmits the event to a Java application 505 that is currently operating.

Note that the application management information includes information indicating which application (JAR file) to start up after a title indicating a playback segment of the video data has changed and information indicating when to end the application currently in use.

The UO detection module 415 detects a UO performed on the remote control 102 or a front panel of the playback apparatus 101, and outputs the detected UO to the mode management module 416.

The mode management module 416 holds a mode management table read from the BD-ROM 105, the HDD 422, or the SDRAM 104, detects that the title has been changed during playback of the BD-ROM 105, and performs mode management and branching control.

Here, mode management refers to indicating either the HDMV module 413 or the BD-J module 414 as the module to cause execution of the dynamic scenario. Also, branching control refers to determining, when the title has switched, whether to issue an instruction to the BD-J module 414 or to the HDMV module 413 to start up and shut down the title, in accordance with information indicating which mode the title switched to and which mode the title switched from.

Out of UOs detected by the UO detection module 415, the dispatcher 417 selects only a UO that is appropriate for the present mode, and dispatches information indicating the selected UO to the module corresponding to the present mode. For example, while HDMV mode is being executed, if an "activate" UO is received by directional control, these UOs are output to the module of HDMV mode.

The rendering engine 418 includes infrastructure software such as Java2D and OPEN-GL (Open Graphics Library), performs drawing of computer graphics according to instructions from the BD-J module 414, and outputs the drawn computer graphics to the image plane 408.

The AV playback library 420 executes AV playback functions and playlist playback functions in accordance with function invocations from the HDMV module 413 and the BD-J module 414.

Here, the AV playback functions are processing such as starting playback, stopping playback, pausing, restarting after pausing, canceling still image function, high speed fast-forward, high speed rewind, switching audio, switching secondary video, switching angle, etc. Also, out of the AV playback functions, the playlist playback functions include starting and stopping playback, and are performed in accordance with playlist information.

The network interface 421 connects to the Internet by control of the BD-J module 414 with use of the network module 605, downloads additional content, etc. by accessing the provider of the additional content corresponding to the BD-ROM 105, and stores the additional content, etc. that has been downloaded to the HDD 422 or the SDRAM 104.

The HDD 422 is a hard disk that stores downloaded additional content files, merge management files, signature information files, data that is used by applications, etc.

Also, the SDRAM 104 is a removable recording medium that stores files such as additional content files similarly to the HDD 422.

Upon insertion of the BD-ROM 105 or during playback thereof, the virtual file system 423 receives a selection from the user indicating whether to use, or not use, the SDRAM 104 or the HDD 422 when playing back the BD-ROM 105. Also, the virtual file system 423 activates the SDRAM 104 when a selection to use the SDRAM 104 has been received, and deactivates the SDRAM 104 when a selection not to use the SDRAM 104 has been received.

Here, activation of the SDRAM 104 means changing the status of the SDRAM 104 to enable files to be read from and written to the SDRAM 104 by the Java application 601, while the BD-ROM 105 is being played back.

Specifically, the virtual file system 423 stores information indicating that the SDRAM 104 has been activated in a memory. If the Java application 601 has defined an argument and made an inquiry for information on media that is currently activated, the virtual file system 423 returns information pertaining to the activated SDRAM 104 that stores data for the virtual package.

Also, media deactivation, in an opposite way to activation, means changing the status of the SDRAM 104 so that files cannot be read from and written to the SDRAM 104 by the Java application 601. Similarly to the case of activation, the virtual file system 423 stores information in the memory indicating that the SDRAM 104 has been deactivated.

Furthermore, if the SDRAM 104 is inserted, the virtual file system 423 performs virtual package construction judgment processing to judge whether the virtual package can be constructed with use of the activated media.

Below, virtual package construction judgment processing is described.

The virtual file system 423 judges whether a directory whose directory name is a provider ID indicating the provider of the BD-ROM 105 package exists in the activated SDRAM 104 or HDD 422, and whether a merge management information file and a signature file for verifying authenticity of the merge management information file exist in a directory whose directory name is a DiskID read by the DiskID confirmation module.

Furthermore, the virtual file system 423 performs signature verification on the merge management information file with use of the signature file, and according to the result of the file existence judgment and the result of the signature verification, constructs and plays back the virtual package.

The following describes the signature information file and the signature verification.

The signature information file indicates the electronic signature of the BD package provider so that the authenticity of the merge management information file can be verified. When the additional content is downloaded, the signature information file is saved under the file name "DiskID".sig in the SDRAM 104 or the HDD 422, in a directory whose directory name is the DiskID of the BD-ROM 105.

A hash value of the merge management information file generated with use of the secret key corresponding to the public key on the merge certificate of the BD-ROM 105 is encrypted and stored in the signature information file.

As described above, the merge certificate is stored in the BD-ROM 105 under the file name "BD.CERT", and is used as the certificate used for verifying the authenticity of the merge management information file. The merge certificate includes a public key made available publicly by the provider of the additional content. The virtual file system 423 performs signature verification of the merge management information file by verifying whether the hash value of the merge management information file matches the result of the decryption with use of the public key included in the merge certificate.

Note that X.509 can be used as an example of a file format of the merge certificate. Detailed specifications of X.509 are described in CCITT Recommendation X.508 (1988), "The Directory-Authentication Framework", published by the International Telegraph and Telephone Consultative Committee.

If the result of the virtual package judgment processing is that construction is possible, the virtual file system 423 constructs and plays back the virtual package. If the result is that construction is not possible, the virtual file system 423 plays back the BD package of the BD-ROM 105. Note that playback of the virtual package is performed every time an ACCESS UNIT included in the AV stream recorded on the BD-ROM 105 is read by the track buffer 402, and is performed by reading the ACCESS UNIT included in the AV stream of the additional content recorded on the HDD 422 or the SDRAM 104, and transmitting the ACCESS UNIT read by the track buffer 402 and the ACCESS UNIT read from the HDD 422 or the SDRAM 104 to the demultiplexer 403.

Also, upon receiving information from the detection module 608 indicating that the SDRAM 104 has been removed, the virtual file system 423 transmits information to the detection module 608 indicating whether the virtual package is being played back with use of the SDRAM 104, and stops playback of the virtual package. Also, the virtual file system 423 reconstructs the virtual package and restarts playback according to whether an instruction to continue playback of the virtual package has been received via the UO detection module 415, and whether information indicating that the SDRAM 104 has been inserted again has been received from the detection module 608.

Data

The following describes data used by the playback apparatus 101.

Figures 7A, 7B, 7C:
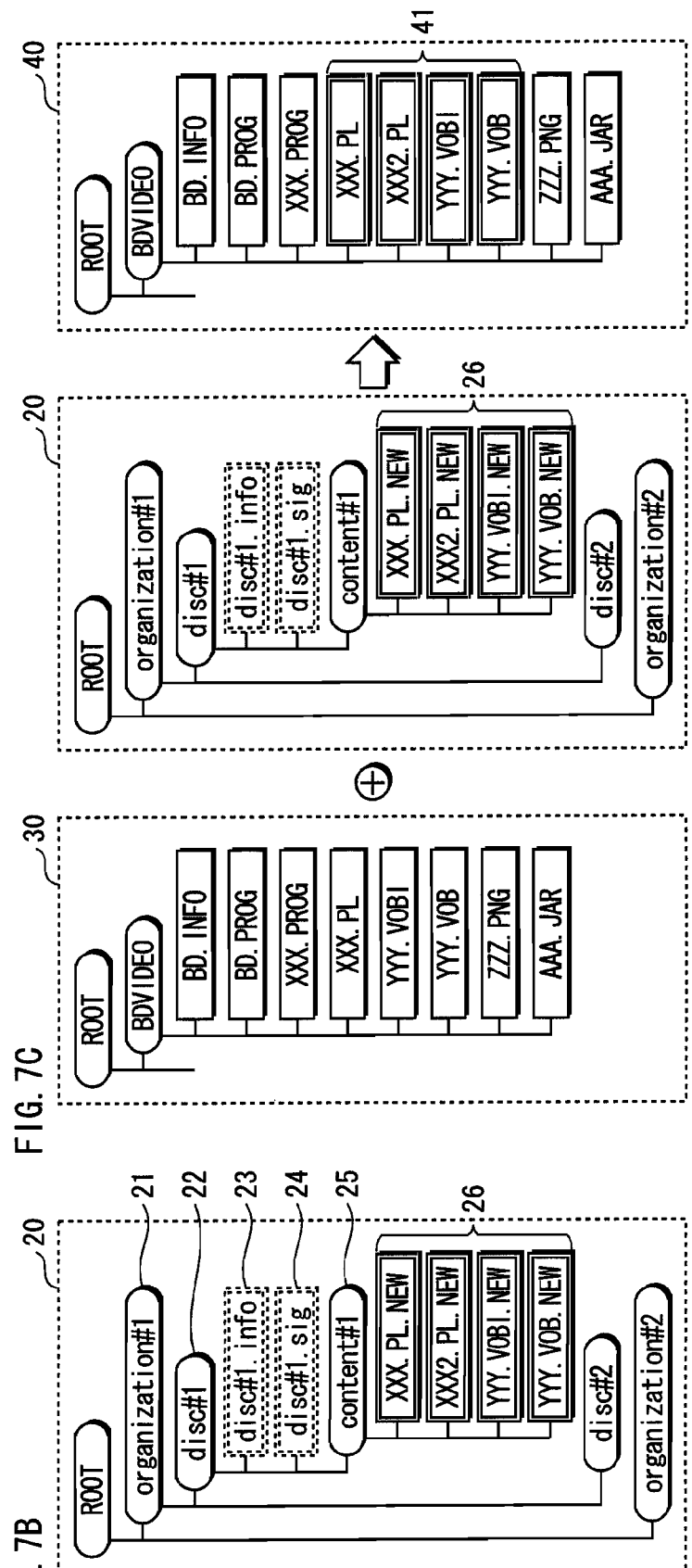
FIG. 7A shows an exemplary structure of merge management information and data thereof.
FIG. 7B shows exemplary HDD or SD-RAM directories and files.
FIG. 7C is an overall view of a virtual package constructed using a BD-ROM, a HDD, or an SDRAM.

FIG. 7A shows an exemplary structure of merge management information and data thereof.

As described above, merge management information is stored on the HDD 422 or the SDRAM 104 after being downloaded from the provider of the additional content of the BD package.

As shown in FIG. 7A, merge management information 10 includes file storage position information 11 and a virtual path 12.

Here, the file storage position information 11 indicates positions in the HDD 422 or the SDRAM 104 where files for constructing the virtual package are stored.

For example, in FIG. 7A, "XXX.PL.NEW" is one of the files of additional content, and is stored under the "content#1" directory that belongs to the "disc#1" directory in the "organization#1" directory. Note that these directories are described later.

Also, the virtual path 12 indicates paths of content files in the virtual package. The virtual file system 423 constructs a virtual package similar to the BD package by merging the content of the BD-ROM 105 and the additional content on the HDD 422 or the SDRAM 104 in accordance with a merge rule indicated by the virtual path 12.

FIG. 7B shows exemplary directory structures of the HDD 422 and the SDRAM 104 and exemplary additional content, merge management information, and signature information stored in the directories shown in FIG. 7B.

Here, a file storage area is described in which files for downloading additional content to the HDD 422 and the SDRAM 104 etc. are stored.

Files used for the virtual package such as additional content, merge management information files, and signature information files downloaded to the HDD 422 or the SDRAM 104 are recorded according to a predetermined rule to a particular area called a "Binding Unit Data Area" in each medium, separately for each BD package provider and each DiskID of the BD-ROM 105. Data other than the virtual package that is used by applications is recorded to an area other than the Binding Unit Data Area.

As described above, when additional content is downloaded, the directories of the HDD 422 and the SDRAM 104 shown in FIG. 7B are generated in the Binding Unit Data Area of the medium specified by the user.

Files used for the virtual package (Binding Unit Data) are stored in the Binding Unit Data Area. As a storage unit for the Binding Unit Data, a directory (hereinafter referred to as a "provider ID directory") that indicates a provider ID of the provider of the BD package is set in this area. Also, the directory whose directory name is the DiskID for identifying each BD package (hereinafter referred to as "DiskID directory") is set under the corresponding provider ID directory, and a directory for storing additional content corresponding to each DiskID (hereinafter referred to as "content directory") is set under the corresponding DiskID directory.

Note that the provider ID and the DiskID are pre-stored in BD.INFO in the BD-ROM 105, and when additional content is downloaded, the provider ID and the DiskID are read from the BD.INFO.

In the case of FIG. 7B, organizational (21) indicates a provider ID directory, disk#1 (22) indicates a DiskID directory, and content#1 (25) indicates the content directory.

Merge management information and signature information downloaded along with the additional content are stored in the DiskID directory under the file names "(DiskID).info" and "(DiskID).sig", respectively. In the case of FIG. 7B, the merge management information file stored in the directory disk#1 (22) is disk#1.info (23), and the signature information file is disk#1.sig (23).

Also, the content file corresponding to disk#1 is stored under the Content#1 (25) directory, and XXX.PL.NEW to YYY.VOB.NEW (26) indicate additional content files.

FIG. 7C is an overall view of hierarchical directory construction of virtual packages generated by merging the BD package of the BD-ROM 105 and the additional content recorded on the HDD 422 or the SDRAM 104.

In FIG. 7C, a dash line rectangle 30 indicates an exemplary content file in the BD-ROM 105, and similarly to FIG. 7B, a dash line rectangle 20 indicates an additional exemplary content file in the directory of the HDD 422 or the SDRAM 104. A dash line rectangle 40 indicates an exemplary file in the virtual package.

As shown in FIG. 7C, a file group 26 in the content#1 directory of the HDD 422 or the SDRAM 104 is merged with the BDVIDEO directory in the virtual package so as to match the paths indicated by the virtual path 12 of the merge management information 10 (FIG. 7A) stored in the disk#1.info of the HDD 422 or the SDRAM 104, resulting in the additional content file group 41 being positioned in the virtual package indicated by the dash line rectangle 40.

The following describes a title that is a playback segment of the BD-ROM 105 in the present embodiment and access to the virtual package from the Java application 601.

Figure 8:
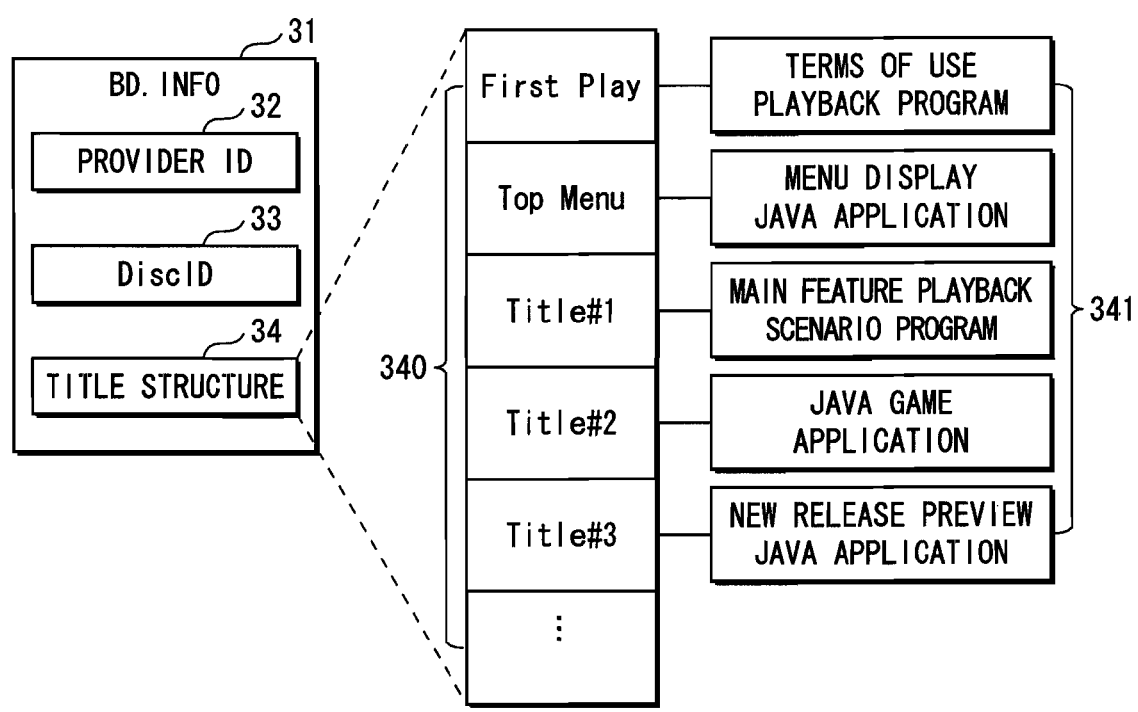
FIG. 8 shows exemplary playback segments of BD packages.

FIG. 8 shows playback segments of BD packages in the present embodiment, and the following describes titles indicating the playback segments of BD packages in the present embodiment.

BD.INFO 31 in FIG. 8 indicates a BD.INFO file on the BD-ROM 105. A provider ID 32, a DiskID 33, and a title structure 34 are stored in the BD.INFO file.

The title structure 34 includes title information 340 indicating playback segments that correlate applications on the BD-ROM 105 and the AV stream. The title information 340 is stored in correspondence with execution information 341 indicating applications and programs to be executed for each title.

When the BD-ROM 105 is inserted, the virtual file system 423 plays back a "First Play" that displays the terms of use of the BD-ROM 105, etc. If the user presses a menu key on the remote control 102, a "Top Menu" is played back.

The following describes an example of accessing the virtual package from the Java application 601 when the BD package is being played back in the playback segments indicated in FIG. 8.

For example, after playing back the "First Play", when the Java application 601 has invoked an API that lists files of the BDVIDEO directory, the virtual file system 423 transmits file information of the BDVIDEO directory in the virtual package to the Java application 601.

After the Java application 601 accesses the XXX2.PL file in accordance with the file information transmitted from the virtual file system 423, the virtual file system 423 refers to the file accessed by the Java application 601, and if the file matches a path 13 indicated by the virtual path 12 of the merge management information, transmits, to the Java application 601, a value indicated by the file storage position information 11 corresponding to the path of the XXX2.PL file in the HDD 422 or the SDRAM 104.

The Java application 601 can execute a Java program with use of the value transmitted from the virtual file system 423 and access the XXX.2PL file via the virtual file system 423.

Operation

The following describes the operation of the playback device 101 pertaining to the present embodiment.

Figure 9:
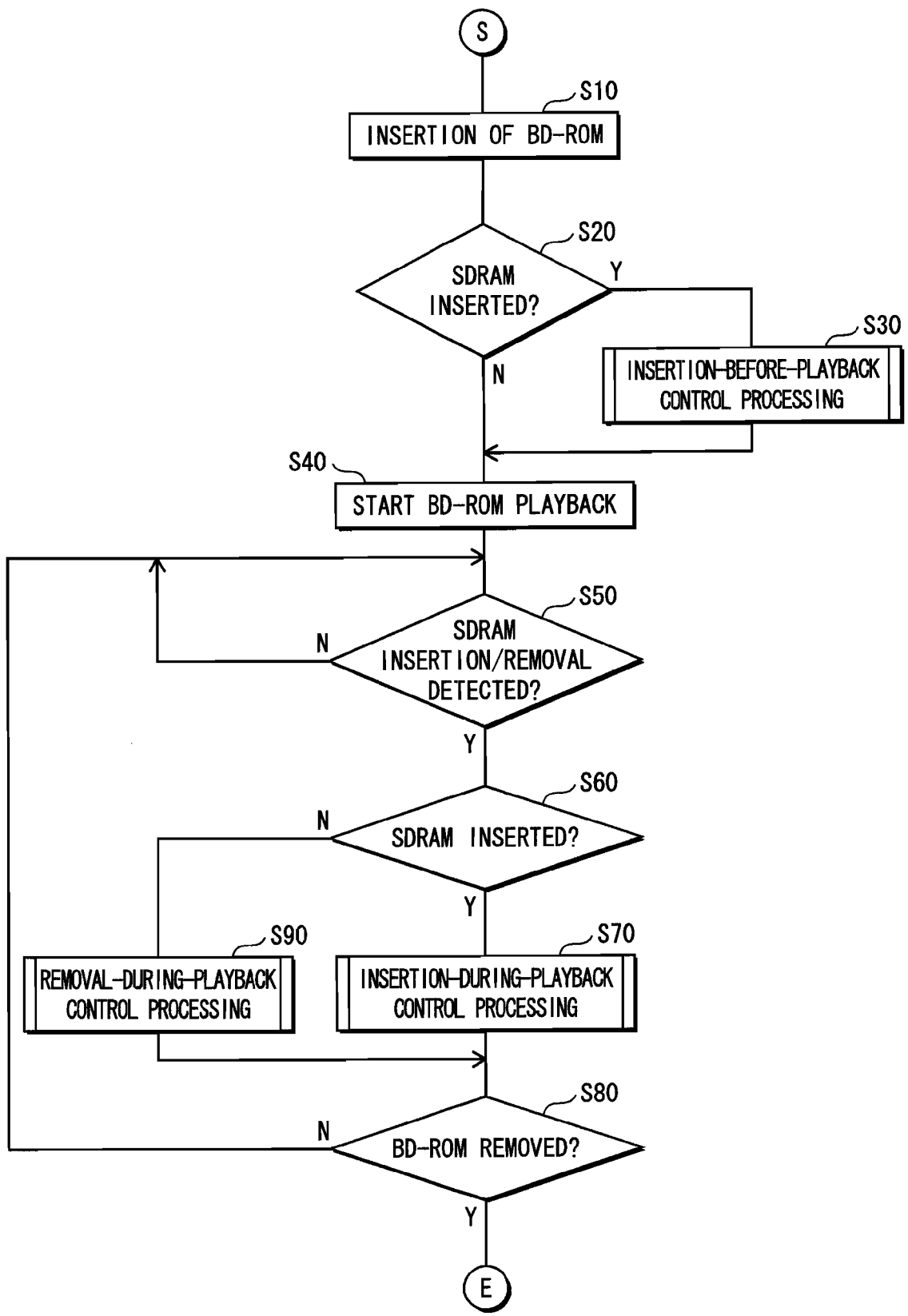
FIG. 9 shows an operation flow of the playback apparatus pertaining to the present invention.

FIG. 9 shows an operation flow of the playback apparatus 101, and the following describes the playback apparatus 101 with reference to FIG. 9.

Note that the following description of the operation is divided into parts, the parts being playback control processing performed when the SDRAM 104 has already been inserted before playback of the BD-ROM 105 (hereinafter referred to as "insertion-before-playback control processing"), playback control processing performed when the SDRAM 104 is inserted during playback of the BD-ROM 105 (hereinafter referred to as "insertion-during-playback control processing"), and playback control processing when the SDRAM 104 has been removed during playback of the virtual package with use of the BD-RAM 105 and the SDRAM 104 (hereinafter referred to as "removal-during-playback control processing").

In step S10, when the BD-ROM 105 is inserted by the user, the detection module 608 detects whether the SDRAM 104 is inserted in the insertion slot 106 (step S20).

In step S20, if the detection module 608 detects that the SDRAM 104 is inserted (step S20: Y), the detection module 608 transmits information indicating that the SDRAM 104 is inserted to the virtual file system 423. The virtual file system 423 receives the information from the detection module 608 indicating that the SDRAM 104 is inserted, and performs insertion-before-playback control processing (step S30).

Insertion-Before-Playback Control Processing

The following describes the insertion-before-playback control processing of step S30 (FIG. 9).

Figure 10:
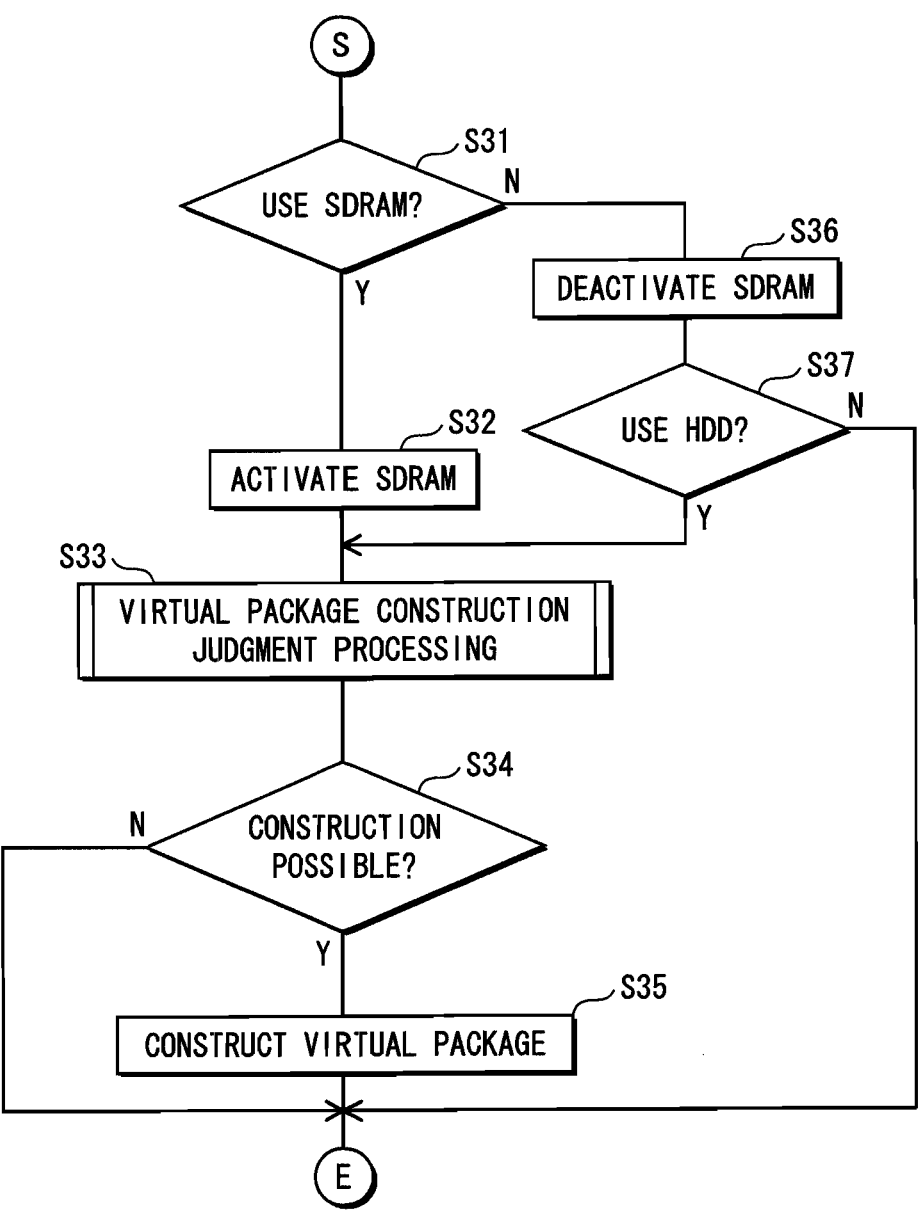
FIG. 10 shows an operation flow of insertion-before-playback control processing pertaining to the embodiment.

FIG. 10 shows an operation flow of insertion-before-playback control processing, and the following describes insertion-before-playback control processing with reference to FIG. 10.

In step S31 of FIG. 10, the detection module 608 generates a media selection image for receiving, from the user, a selection of whether to use the SDRAM 104, displays the generated media selection image on the display 103, and receives a selection from the user (step S31).

In step S31, upon receiving a selection from the dispatcher 417 via the UO detection module 415 to use the SDRAM 104 in accordance with a remote control operation by the user (step S31: Y), the virtual file system 423 activates the SDRAM 104 (step S32).

Next, the virtual file system 423 performs virtual package construction judgment processing on the SDRAM 104 (step S33). If the judgment result of step S33 is that constructing the virtual package is possible (step S34: Y), the additional content file recorded on the SDRAM 104 is merged with the content file of the BD-ROM 105 according to a merge rule indicated by the virtual path 12 of the merge management information 10 recorded on the SDRAM 104, and the virtual package is constructed (step S35).

Also, if the judgment result of step S33 is that the virtual package cannot be constructed (step S34: N), processing is ended.

Also, in step S31, if the virtual file system 423 receives a selection from the dispatcher 417 via the UO detection module 415 not to use the SDRAM 104 (step S31: N), the virtual file system 423 deactivates the SDRAM 104 (step S36).

Next, the detection module 608 generates an image for receiving as selection from the user whether to use the HDD 422, displays the image on the display 103, and receives the selection from the user (step S37).

In step S36, if the virtual file system 423 receives a selection to use the HDD 422 from the user (step S37: Y), processing from step S33 onward is performed on the HDD 422. If a selection not to use the HDD 422 is received from the user (step S37: N), the processing is ended.

Here, virtual package construction judgment processing of step S33 is described.

Figure 11:
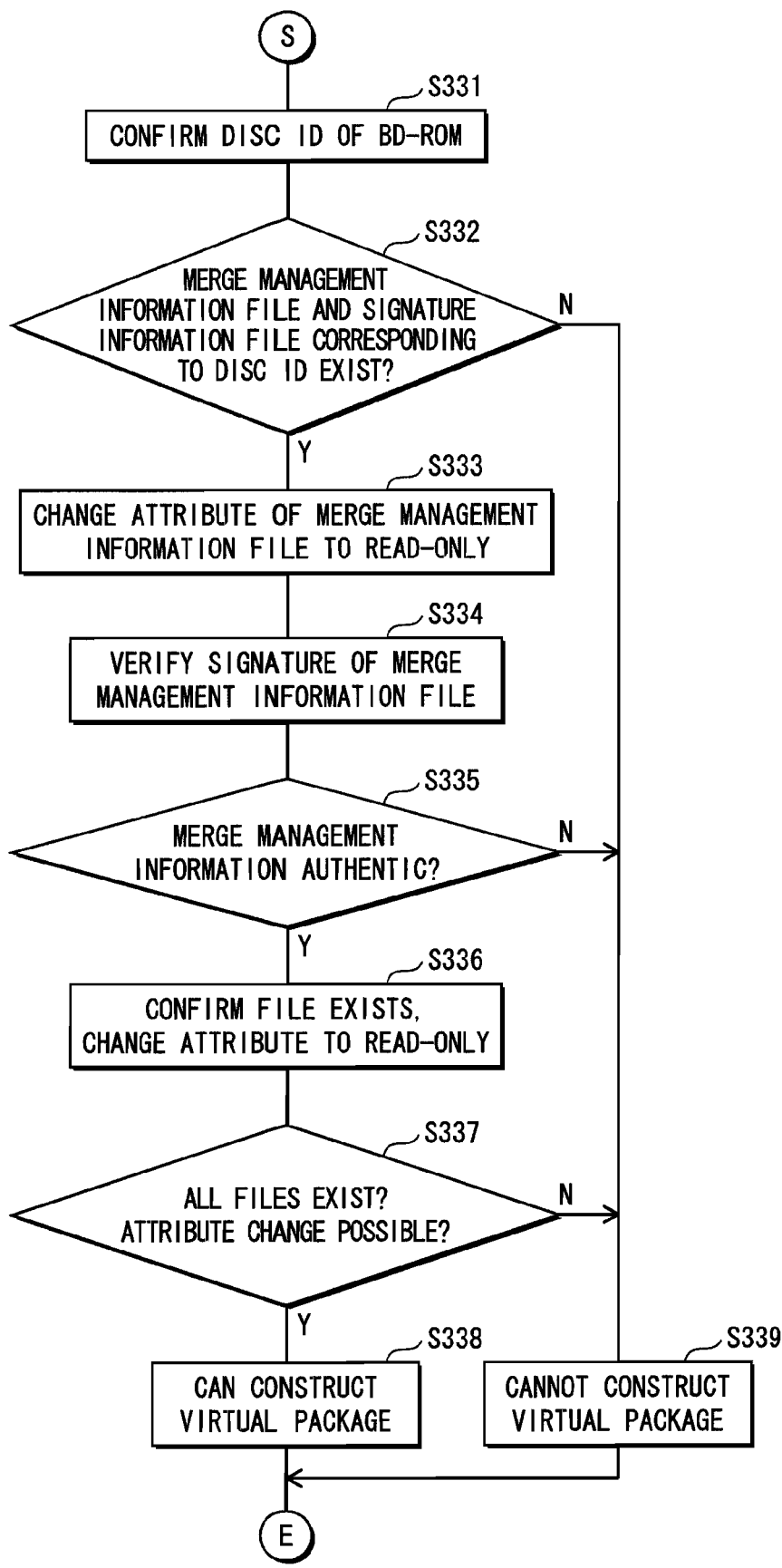
FIG. 11 shows an operation flow of virtual package construction judgment processing.

FIG. 11 shows a flow of virtual package construction judgment processing.

In step S331 of FIG. 11, the virtual file system 423 confirms the DiskID of the BD-ROM 105 via the DiskID confirmation module 607.

Next, the virtual file system 423 judges whether a merge management information file and a signature information file corresponding to the DiskID confirmed in step S331 exist in the DiskID directory in the SDRAM 104 (step S332).

In step S332, if the merge management information file and the signature information file are judged to exist (step S332: Y), the attribute of the merge management file stored in the DiskID directory on the SDRAM 104 is changed to read-only (step S333), and signature verification processing is performed to determine whether the merge management information file is authentic (step S334), with use of the signature information file stored in the DiskID directory on the SDRAM 104.

If the merge management information is judged to be authentic as a result of the signature verification of step S334 (step S335: Y), the virtual file system 423 confirms whether the files of the paths indicated by the file storage position information 11 of the merge management information 10 exist in the SDRAM 104, and the attributes of the files are changed to read-only (step S336).

In step S336, if all of the files on the paths indicated by the file storage position information 11 of the merge management information 10 exist in the SDRAM 104, and the attributes of all the files have been changed to read-only (step S337: Y), the virtual file system 423 judges that the virtual package can be constructed with use of the additional content recorded on the SDRAM 104 (step S338).

Also, if the merge management information is judged not to be authentic in the signature verification of step S334 (step S335: N), or if not all the files are judged to exist in step S336, or if not all of the attributes of the files could be changed to read-only (step S337: N), the virtual file system 423 judges that the virtual package cannot be constructed (step S339).

Figure 12:
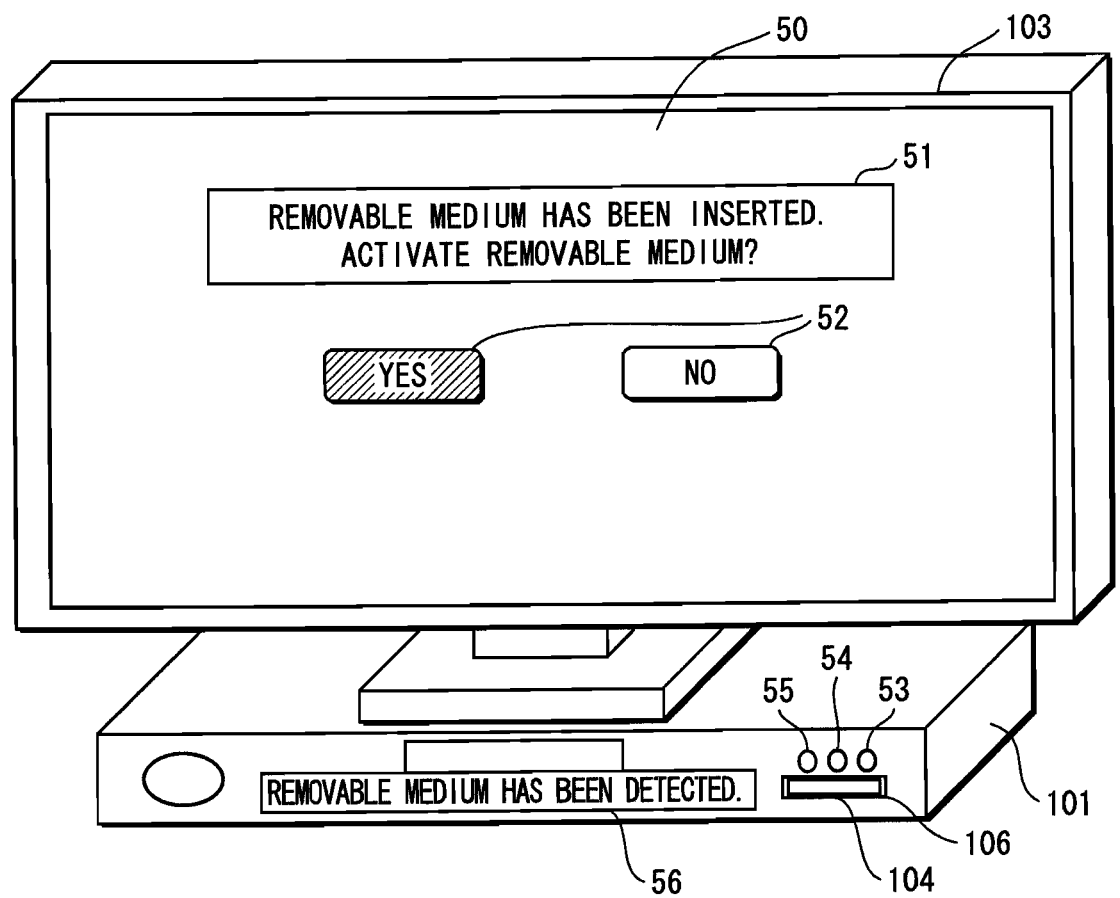
FIG. 12 shows an exemplary display of a media selection image pertaining to the embodiment.

FIG. 12 shows an exemplary display of a media selection image used in step S31 described above for receiving a selection, from the user, of whether to use the inserted SDRAM 104 during playback of the BD-ROM 105.

Upon detecting that the SDRAM 104 is inserted, as shown in FIG. 12, the detection module 608 generates the media selection image that is made up of images 51 and 52, and displays the media selection image on a screen 50 of the display 103.

The user selects either "YES" or "NO" shown on the media selection image 52 with use of the remote control 102. If the selection "YES" is received, the virtual file system 423 activates the SDRAM 104.

Also, as shown in FIG. 12, if the playback apparatus 101 includes a liquid crystal display 56 or the like, information indicating that the SDRAM 104 has been detected may be displayed on the display 56. Also, if the playback apparatus 101 includes a detection lamp 53 made of a LED, etc. for indicating the insertion state of the SDRAM 104, an activation lamp 54 for indicating if the SDRAM 104 is inserted and activated, and a virtual package use lamp 55 for indicating the state of playing back the virtual package with use of the SDRAM 104, causing the lamps to light up enables reporting a current status to the user.

In this case, in step S31, if the user has selected to use the SDRAM 104 (step S31: Y), the detection module 608 lights up the detection lamp 53. In step S32, the virtual file system 423 activates the SDRAM 104. When the detection module 608 receives information from the virtual file system 423 indicating that the SDRAM 104 has been activated, the detection module 608 lights up the activation lamp 54. Also, in step S35, if the virtual file system 423 has constructed a virtual package with use of the SDRAM 104 and plays back the virtual package, upon receiving information from the virtual file system 423 indicating that playback of the virtual package has started, the detection module 608 lights up the virtual package use lamp 55, and upon receiving information from the virtual file system 423 that playback of the virtual package has finished, extinguishes the virtual package use lamp 55.

Figure 13:
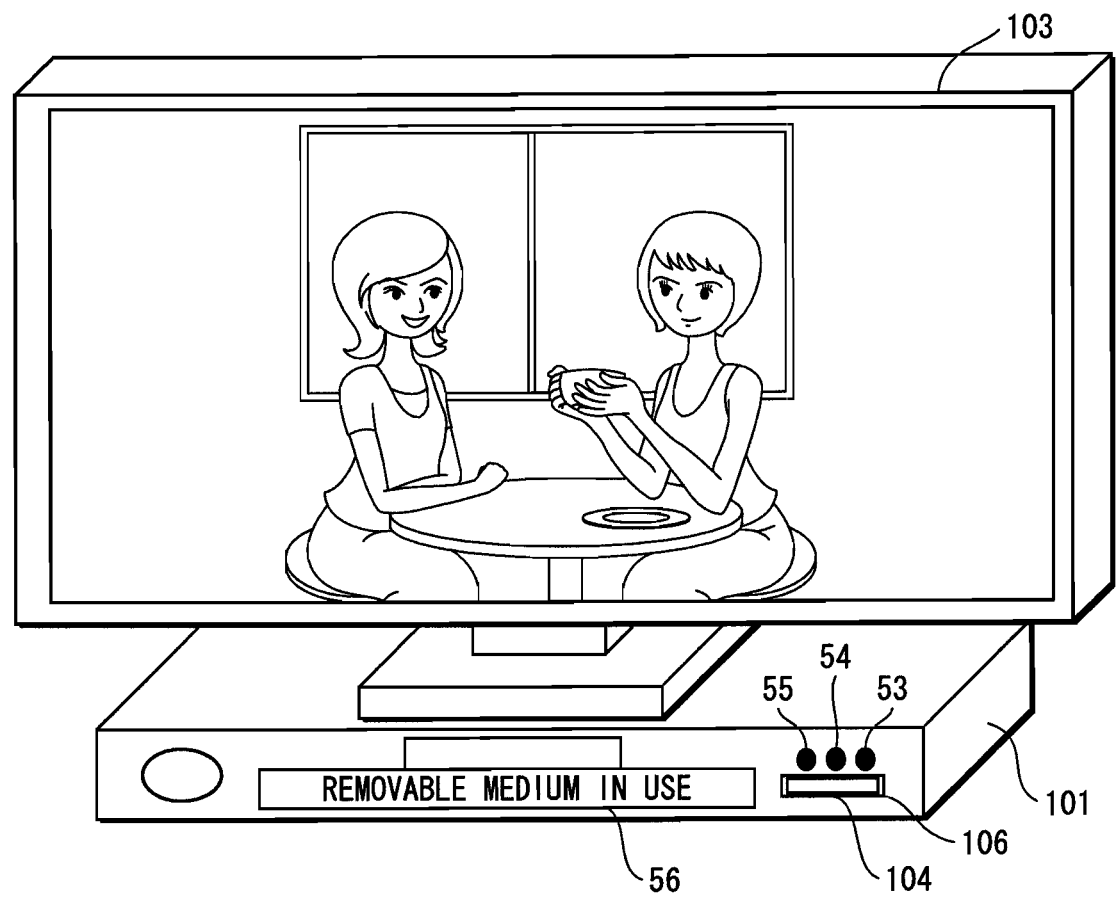
FIG. 13 shows an exemplary display of a playback apparatus when a virtual package is being played back with use of an SDRAM.

If the lamp has been lit as described above, as shown in FIG. 13, during playback of the virtual package with use of the SDRAM 104, information is displayed on the display 56 of the playback apparatus 101 indicating that the SDRAM 104 is being used, and the detection lamp 53, the activation lamp 54, and the virtual package use lamp 55 are all extinguished.

Returning to FIG. 9, processing during playback of the BD-ROM 105 is described.

In step S20 of FIG. 9, if the SDRAM 104 is not inserted (step S20: N), the Java application 601 starts playback of the BD package of the BD-ROM 105 (step S40).

The detection module 608 detects whether the SDRAM 104 is inserted or removed during playback of the BD package (step S50).

Upon detecting that the SDRAM 104 is inserted or removed in step S50, the detection module 608 transmits a detection result indicating the insertion or removal of the SDRAM 104 to the virtual file system 423 (step S50: Y).

If the detection result of step S50 is that the SDRAM 104 is inserted (step S60: Y), the detection module 608 and the virtual file system 423 perform insertion-during-playback control processing (step S70).

Insertion-During-Playback Control Processing

The following describes the insertion-during-playback control processing of step S70.

Figure 14:
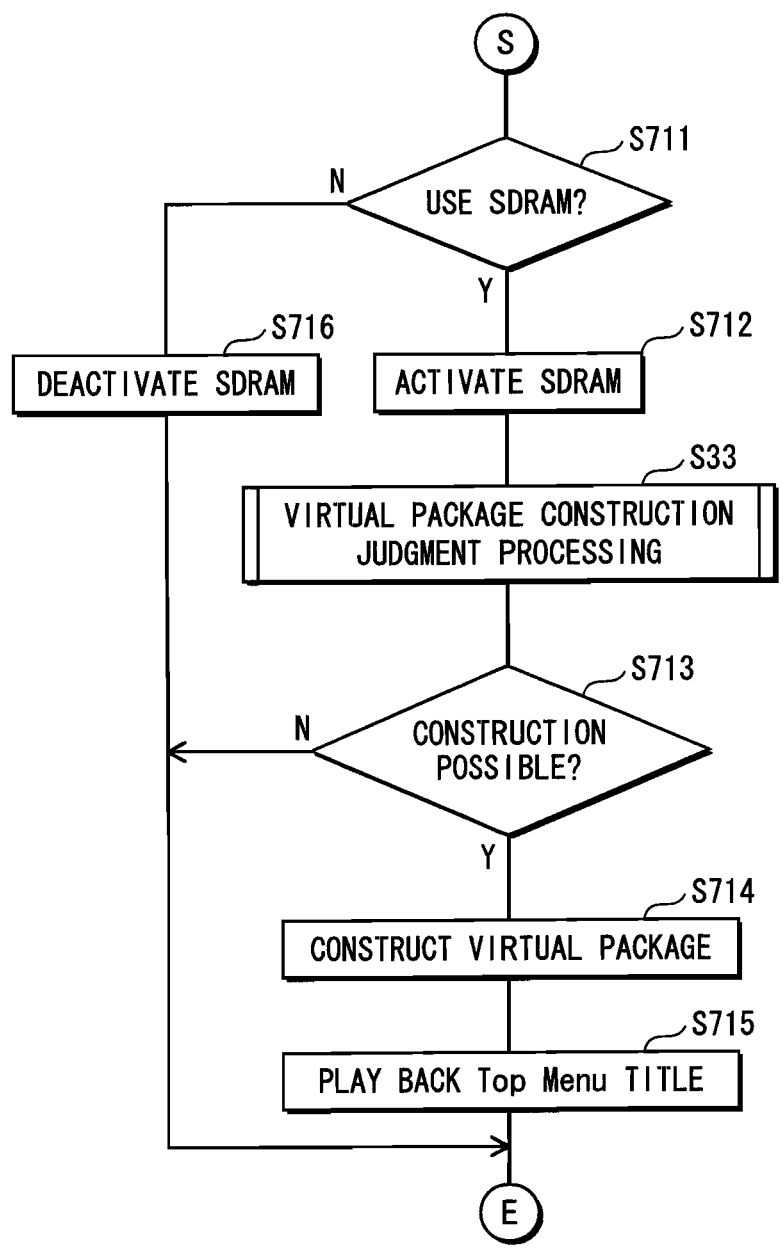
FIG. 14 shows an operation flow of insertion-during-playback control processing pertaining to the embodiment.

FIG. 14 shows an operation flow of insertion-during-playback control processing.

In step S60 of FIG. 9, the detection module 608 transmits a detection result indicating that the SDRAM 104 is inserted to the virtual file system 423, and furthermore, in step S711 of FIG. 14, the detection module 608 generates a media selection image, displays the media selection image on the display 103, and receives a selection of whether to use the inserted SDRAM 104 from the user.

Since processing from step S712 to step S714 is similar to processing from step S31 to step S34 in the above insertion-before-playback control processing, description thereof is omitted.

In step S715, the virtual file system 423 again plays back the "Top Menu" title of the virtual package constructed in step S714.

Also, if a selection to use the SDRAM 104 has not been received in step S711 (step S711: N), the virtual file system 423 deactivates the SDRAM 104 (step S716). If the judgment result of step S33 is that construction is not possible (step S713: N), the virtual file system 423 continues to perform the current playback.

Figure 15:
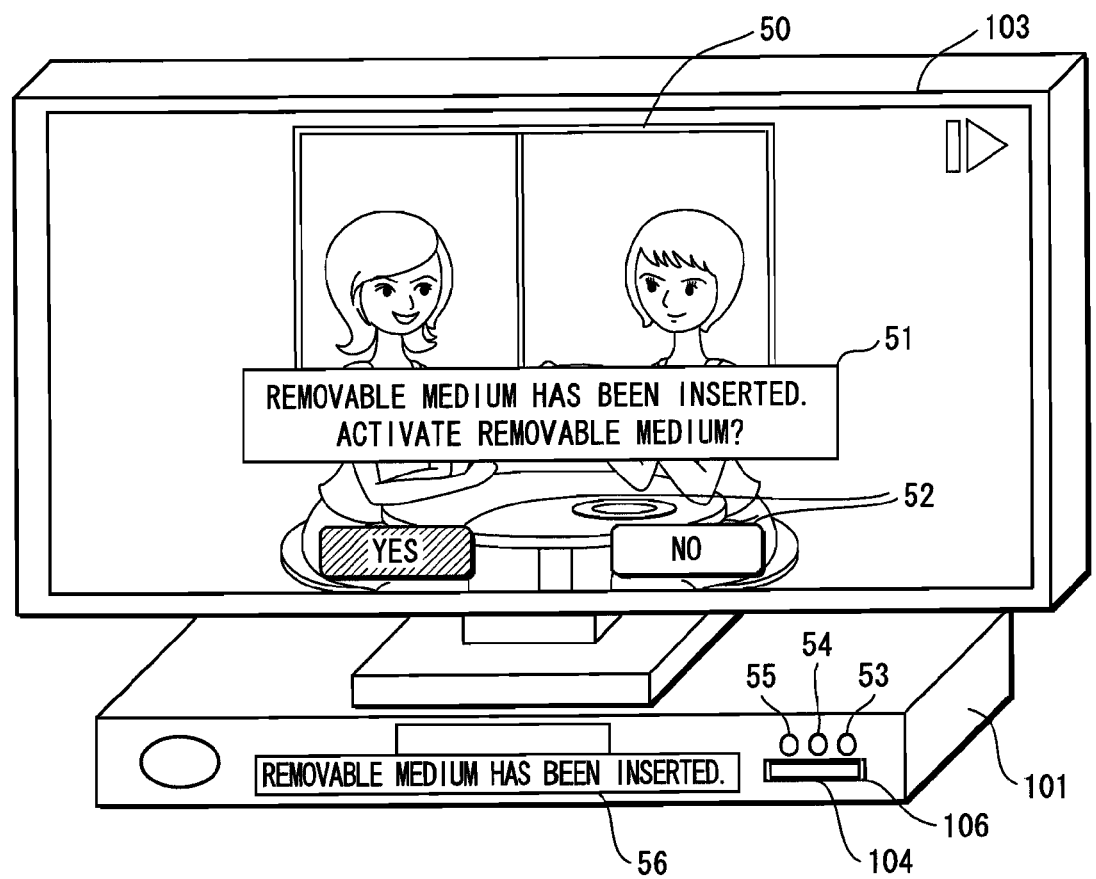
FIG. 15 shows an exemplary display of a media selection image used in insertion-during-playback control processing.

FIG. 15 shows an exemplary display of a media selection image that the detection module 608 displays on the display 103 in step S711 of insertion-during-playback control processing.

Similarly to FIG. 12 described earlier, the playback apparatus 101 in FIG. 15 includes the display 56 and the lamps 53 to 56. The detection module 608 displays the media selection images 51 and 52 so as to overlap with the video currently being played back.

Note that when the media selection images 51 and 52 are being displayed, the AV content may be paused while input is received from the user, or the AV content may be played back while input is being received from the user.

Removal-During-Playback Control Processing

Returning to FIG. 9, if the detection result of step S50 is that the SDRAM 104 has been removed (step S60: N), the detection module 608 and the virtual file system 423 perform removal-during-playback control processing (step S90).

The following describes portions whose functions for performing removal-during-playback control processing are different from those of the constituent elements of the playback apparatus 101 described above.

Operation

Figure 16:
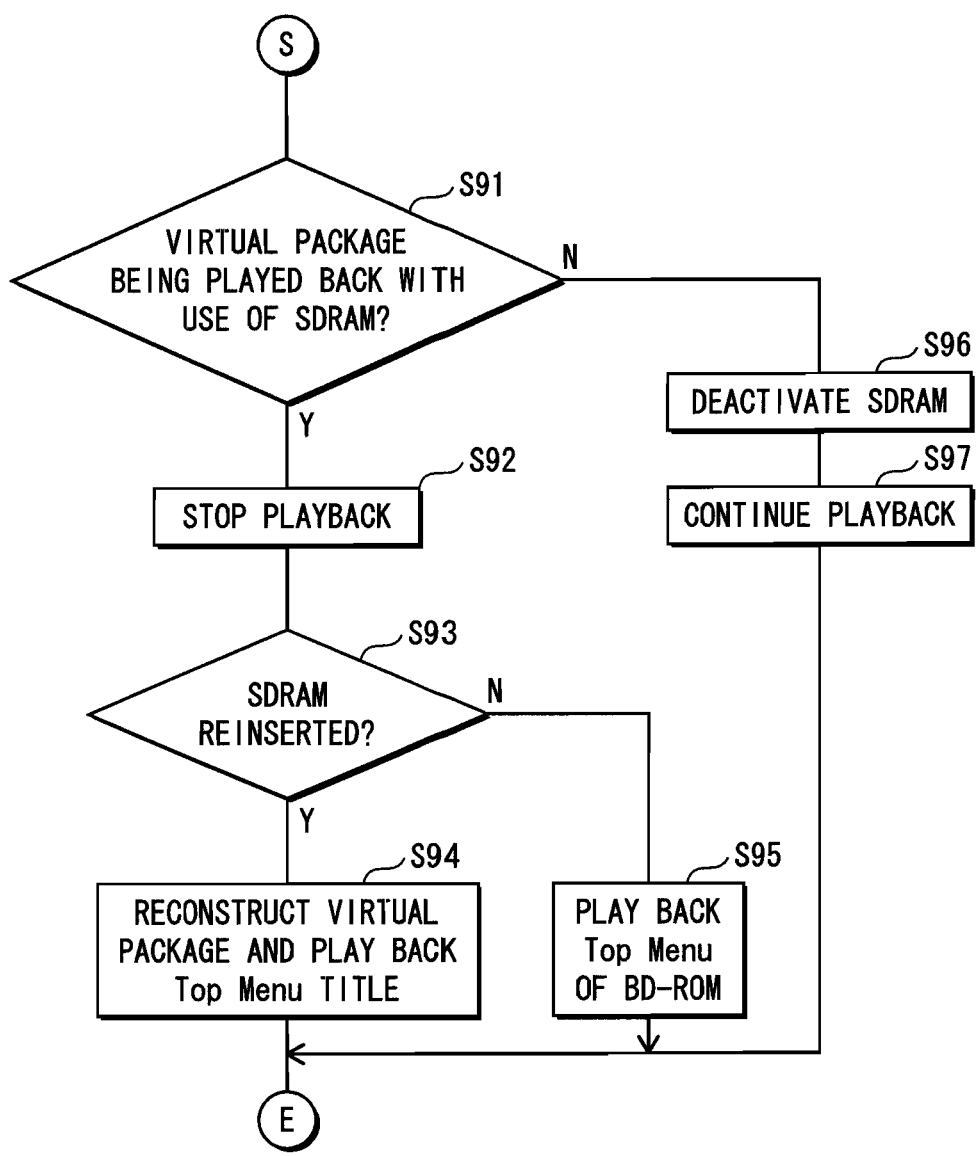
FIG. 16 shows an operation flow for removal-during-playback control processing pertaining to the embodiment.

The following describes an operation flow pertaining to removal-during-playback control processing of step S90 of FIG. 9 with reference to FIG. 16.

If the detection result of the detection module 608 is that the SDRAM 104 has been removed, the detection module 608 transmits the detection result to the virtual file system 423 (step S60: N of FIG. 9).

In FIG. 16, if the virtual file system 423 receives a detection result from the detection module indicating that the SDRAM 104 has been removed, the virtual file system 423 judges whether the virtual package is being played back with use of the SDRAM 104 (step S91).

In step S91, if a judgment has been made that the virtual package is being played back (step S91: Y), the virtual file system 423 stops playback of the virtual package, and transmits information indicating that the virtual package is being played back to the detection module 608 (step S92).

Upon receiving information from the virtual file system 423 indicating that the virtual package is being played back, the detection module 608 generates an image for receiving a selection from the user indicating whether to continue playing back the virtual package, displays the image on the display 103, and detects whether the SDRAM 104 has been inserted again (step S93).

In step S93, if the detection module 608 has detected that the SDRAM 104 has been inserted again, the detection module 608 transmits a detection result indicating that the SDRAM 104 is inserted to the virtual file system 423. If an instruction to continue playback is transmitted to the virtual file system 423 from the dispatcher 417 via the UO detection module 415 (step S93: Y), the virtual file system 423 reconstructs the virtual package with use of the BD-ROM 105 and the SDRAM 104 and plays back the "Top Menu" title of the virtual package (step S94).

Also, in step S93, if an instruction not to continue playback of the virtual package is transmitted from the dispatcher 417 via the UO detection module 415 to the virtual file system 423 (step S93: N), the Java application 601 plays back the "Top Menu" title of the BD-ROM 105 (step S95).

Also, in step S91, if a judgment has been made that the virtual package is not being played back (step S91: N), the virtual file system 423 deactivates the SDRAM 104 (step S96), and continues the current playback (step S97).

Figure 17:
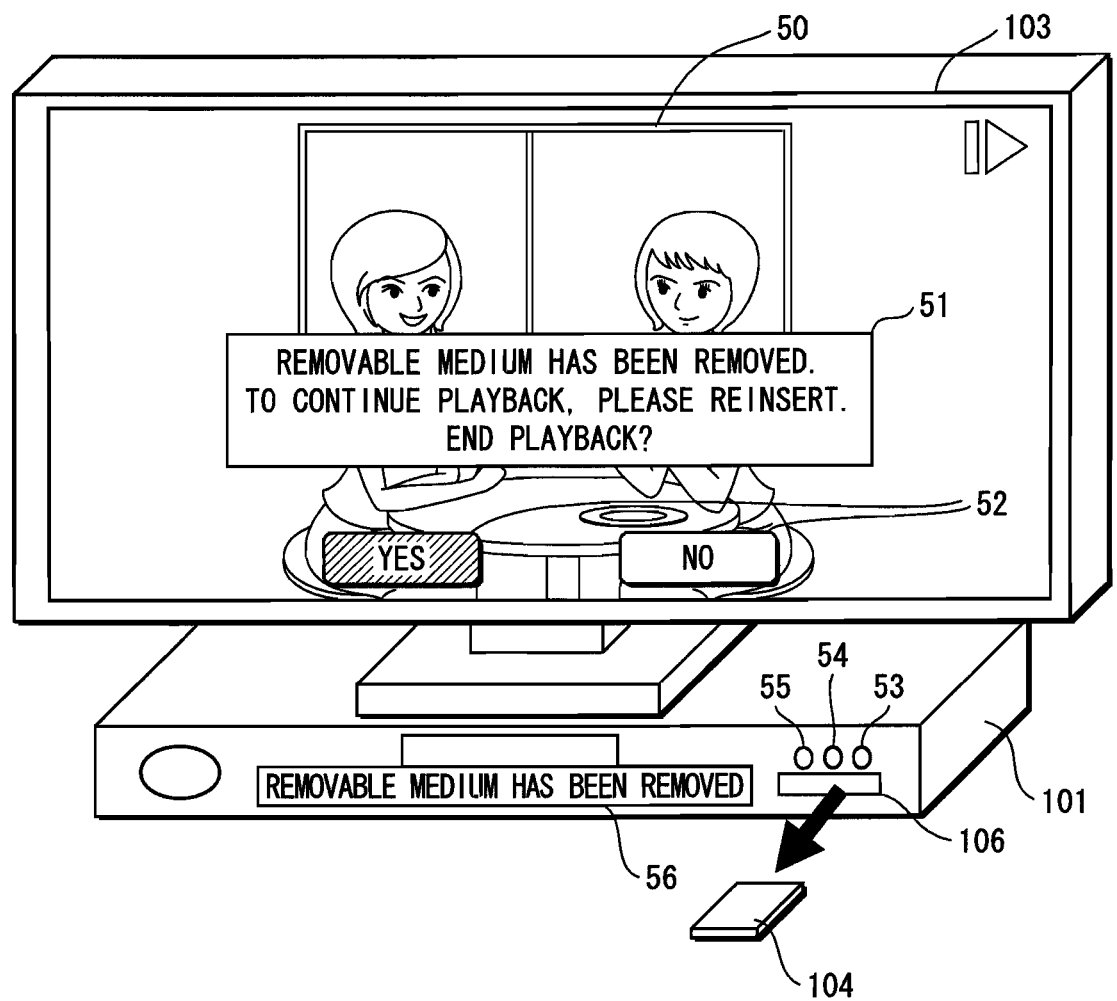
FIG. 17 shows an exemplary display of an image for receiving a selection from a user indicating whether to continue playback of a virtual package.

FIG. 17 shows an exemplary display of an image for receiving a selection from a user indicating whether to continue playback of a virtual package in step S93 described above.

As shown in FIG. 17, the images 51 and 52 are images on the display 103 for receiving a selection of whether to continue playing back the virtual package, and in the present embodiment, are displayed so as to overlap the image of the AV content currently being played back.

Upon checking the images 51 and 52 displayed on the display 103, the user selects one of the buttons corresponding to either "YES" or "NO" by operating the remote control 102, inserts the SDRAM 104 again, and determines whether to continue playback of the virtual package.

Also, as shown in FIG. 17, if the playback apparatus 101 includes the liquid crystal display 56 or the like, information indicating that the SDRAM 10 has been removed may be displayed on the display 56, in accordance with detection by the detection module 608.

Also, if the playback apparatus 101 includes the detection lamp 53, the activation lamp 54, and the virtual package use lamp 55, which are LEDs or the like, lighting the lamps enables reporting the current status to the user.

This concludes the description of insertion-before-playback control processing, insertion-during-playback control processing, and removal-during-playback control processing pertaining to the present embodiment. If the BD-ROM 105 is removed during any of the control processing in FIG. 9, the processing stops (FIG. 9, step S80: Y). If the BD-ROM 105 is not removed during playback of the BD-ROM 105, the processing is performed repeatedly from step S50 onward.

Variation 1

In the above description of insertion-during-playback control processing pertaining to the embodiment, if construction of the virtual package is judged to be possible in the virtual package construction judgment processing (step S33), the virtual package is constructed and the "Top Menu" title is played back. However, construction and playback of the virtual package may also be timed to occur when the title currently being played back changes.

The following describes such a case.

Here, the title change is described with reference to FIG. 8.

The title refers to the title information 340 included in the title structure 34 that is stored in BD.INFO 31 of the BD-ROM 105. For example, after the user has inserted the SDRAM 104 while the "Top Menu" title is being played back, if the user selects a Java game application, a "Title#2" title is played back. In such a case, the title switch from "Top Menu" to "Title#2" occurs when the user selects the application.

In this example, if the virtual package construction judgment processing finishes while the "Top Menu" title is being played back, the virtual package is constructed during processing to switch to the "Title#2" title, and the virtual package is played back starting from the same time that the "Title#2" title is played back.

Note that there are not only cases in which the title switch is the result of a title selection operation by the user, but also cases in which the title switch occurs automatically due to specifications of the application of the current BD package.

The following describes operations of the present variation.

Figure 18:
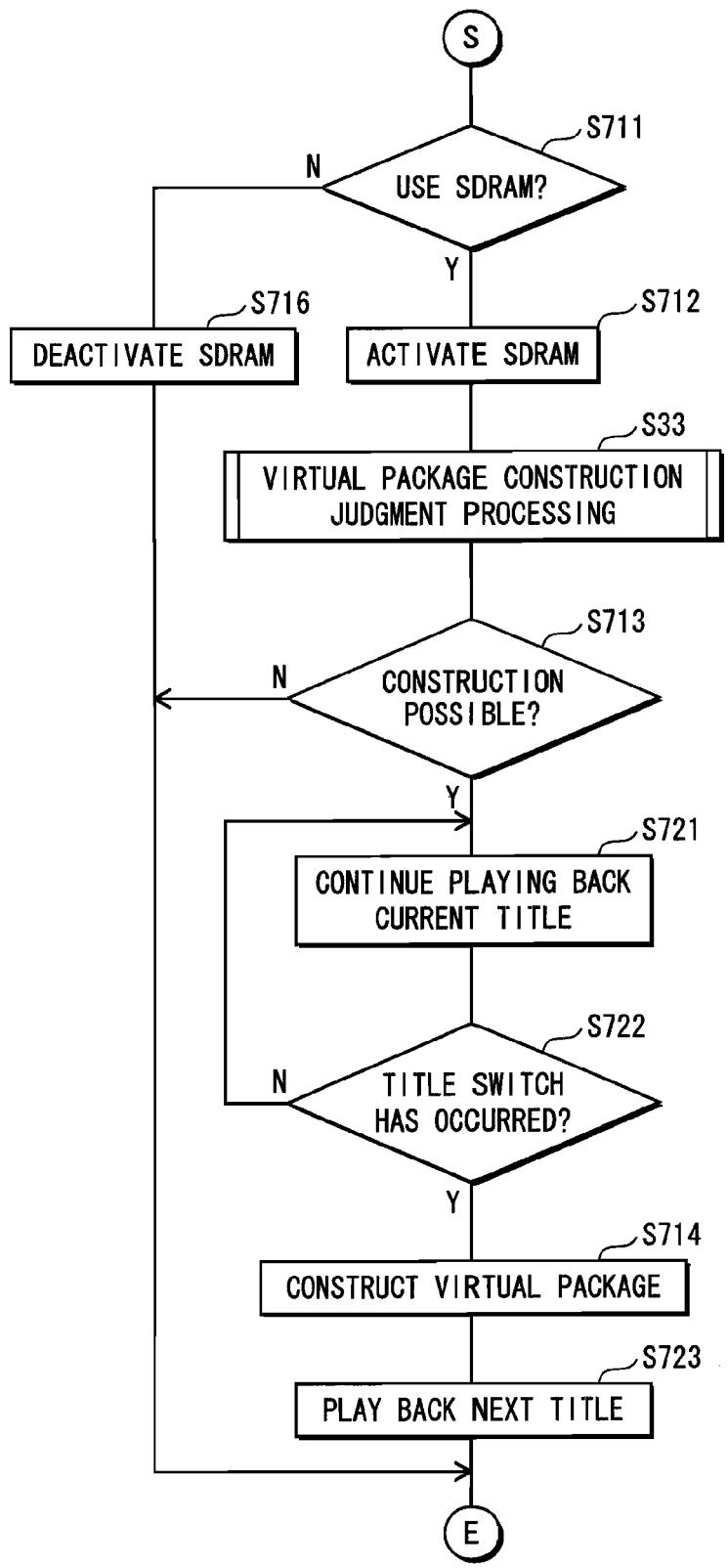
FIG. 18 is an operation flow pertaining to variation 1 of the embodiment.

FIG. 18 shows an operation flow pertaining to the present variation. Note that when processing is the same as the processing of FIG. 14 described in the embodiment, the same reference notations are used.

The processing from step S711 to step S33 of FIG. 18 is similar to that of the embodiment, and description thereof is omitted.

In step S713, if construction of the virtual package is judged not to be possible in the virtual package construction judgment by the virtual file system 423 (step S713: Y), the Java application 601 continues to play back the title currently being played back (step S721).

Next, if the title switch occurs due to receiving a selection by the user, etc. to change to the next title to be played back (step S722: Y), the virtual file system 423 constructs the virtual package with use of the content file of the BD-ROM 105, the additional content file and the merge management file of the SDRAM 104, etc. (step S714), and the next title to be played back, specifically the title that was changed to in step S722, is played back in accordance with the constructed virtual package (step S723).

Variation 2

In the above description of the embodiment, the judgment of whether the virtual package can be constructed is made upon insertion of the SDRAM 104 before or during playback of the BD-ROM 105, and if the virtual package can be constructed, the virtual package is constructed and playback is performed.

The present variation is a working example of a case in which a program for downloading additional content is included in the Java application 601, and while the application in the virtual package is being executed in BD-J mode with use of the SDRAM 104, the download program is executed by the Java application 601.

In this case, by executing the download program, new additional content files, etc. are recorded on the SDRAM 104 or the HDD 422, and the Java application 601 requests the virtual file system 423 to construct the virtual package.

The virtual file system 423 receives the request to construct the virtual package from the Java application 601, updates the virtual package, and plays back the updated virtual package.

Here, the timing of updating and constructing the virtual package of the present variation is described with reference to FIG. 19.

In the virtual package using the SDRAM 104, for example, when the Java application 601 starts up a Java application #0 in BD-J mode and plays back the "Top Menu" title, the program for downloading additional content included in the "Top Menu" is executed by the user, and if new additional content, etc. has been recorded on the SDRAM 104, the Java application 601, downloads the additional content, and thereafter transmits a virtual package update request to the virtual file system 423.

Meanwhile, the Java application 601 is playing back the "Top Menu" title. After receiving an update request 71 for updating the virtual package, the virtual file system 423 performs virtual package construction judgment processing on the new additional content, etc., and prepares to update the virtual package.

After the virtual package construction judgment processing has been completed, if the virtual package can be constructed, the virtual file system 423 transmits an update preparation complete notification 72 to the Java application 601.

Before the Java application 601 switches to "Title#2" of Java application #2 in accordance with a user operation, etc., the virtual file system 423 replaces a merge management information and signature information file 73 currently in use with a new merge management information file and signature information file 74, and constructs the virtual package with use of the replaced merge management information file.

The Java application 601 executes Java application #2 of the virtual package constructed via the virtual file system 423, and shows "Title#2".

Figure 19:
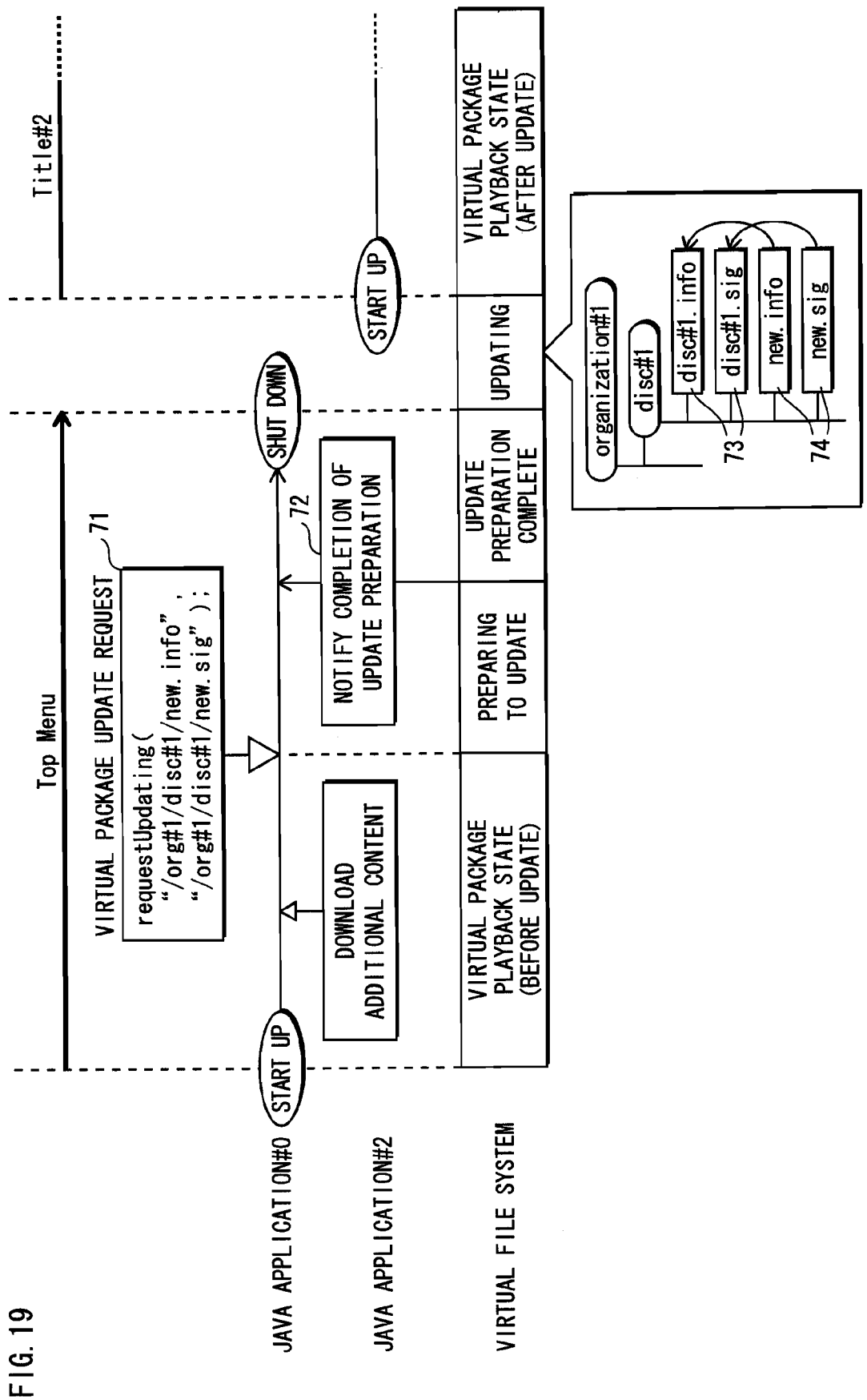
FIG. 19 shows the timing of the update and construction of the virtual package pertaining to variation 2 of the embodiment.
Figure 20:
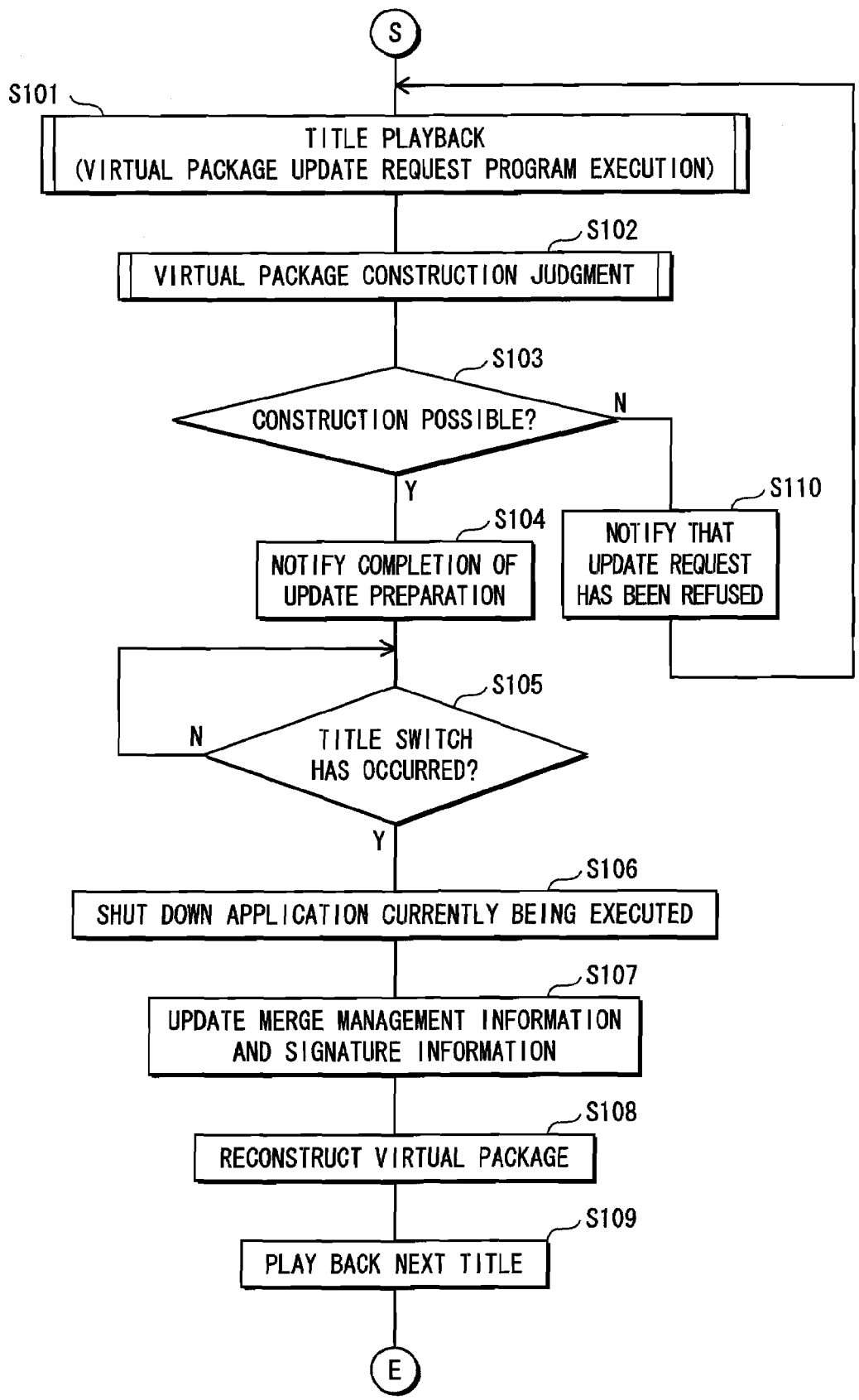
FIG. 20 is an operation flow of virtual package construction processing pertaining to variation 2.

The following describes the operation of virtual package construction processing pertaining to the present variation with reference to FIG. 20, using FIG. 19 as an example.

In step S101 of FIG. 20, the Java application 601 shows the "Top Menu" title, and executes the virtual package update request program in accordance with an operation of the user during playback.

The following describes virtual package construction request program execution processing by the Java application 601.

Figure 21:
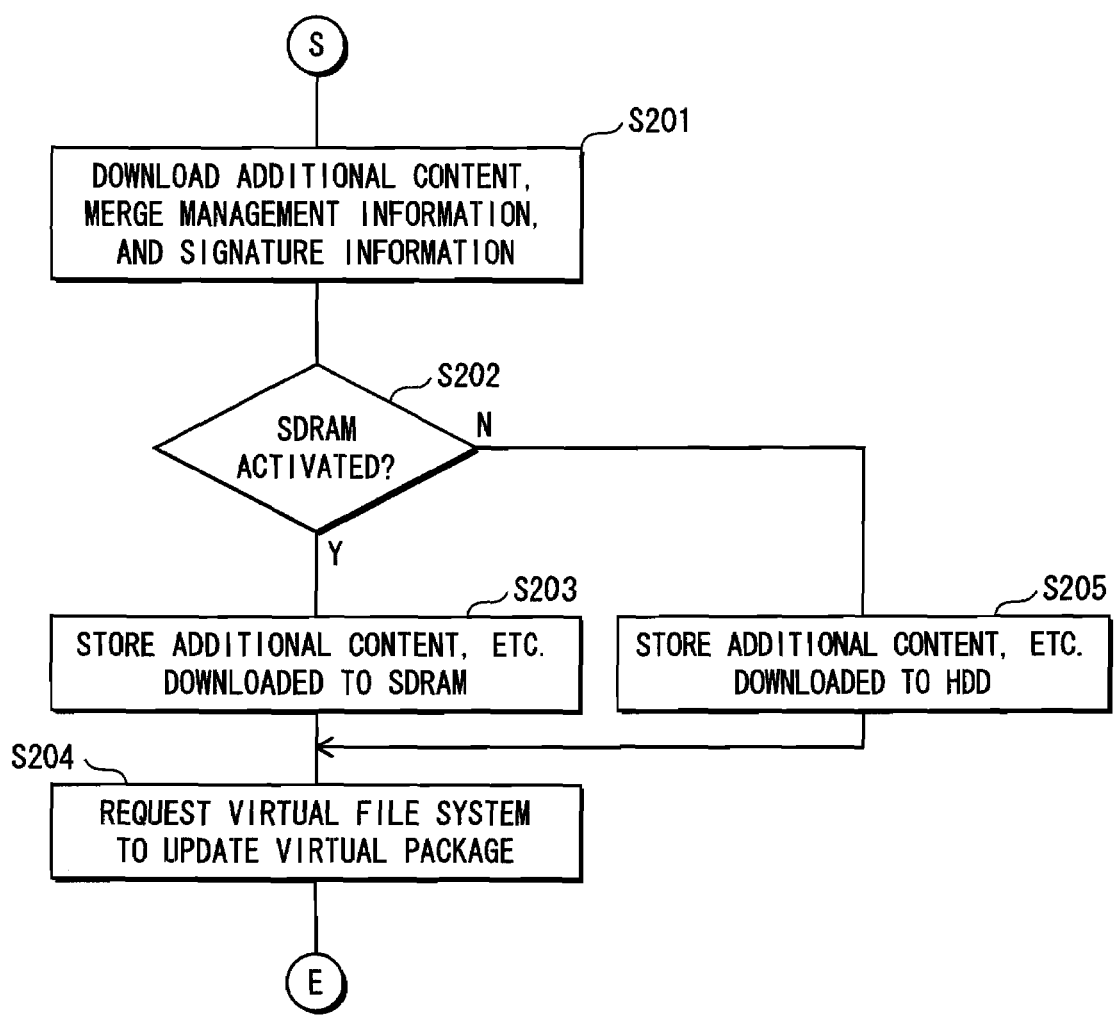
FIG. 21 is an operation flow of virtual package construction request program execution processing pertaining to variation 2.

FIG. 21 is an operation flow of virtual package construction request program execution processing.

In FIG. 21, in accordance with a user operation, the Java application 601 accesses the additional content provider from the network module 605 on the Internet via the network I/F 421 by executing the program for downloading additional content, and downloads the new additional content file, the merge management information file, and the signature information file (step S201).

Next, the Java application 601 inquires of the virtual file system 423 whether the SDRAM 104 has been activated (step S202), and if information indicating that the SDRAM 104 has been activated is received from the virtual file system 423 (step S202: Y), stores the downloaded merge management information file and the signature file under the file names "new.info" and "new.sig" in the "disk#1" directory on the SDRAM 104 that is the same as the DiskID "disk#1" of the BD package currently being played back via the I/O module 604, and stores the additional content file in the content directory under the disk#1 directory (step S203).

After step S203, the Java application 601 designates, to the virtual file system 423, a path of the new merge management information file and the signature information file, and performs an update request of the virtual package (step S204).

Returning to FIG. 20, if the virtual package update request has been transmitted from the Java application 601 in step 204, the virtual file system 423 performs virtual package construction judgment processing with use of the merge management information file and signature information file (step S102).

If the result of judgment by the virtual file system 423 in step S102 is that construction is possible (step S103: Y), the virtual file system 423 transmits an update preparation completion notification to the Java application 601 (step S104).

Next, when the Java application 601 causes a title switch to occur from the "Top Menu" title to "Title#2" (step S105) the virtual file system 423 stops playing back the "Top Menu" currently being played back (step S106), replaces the merge management information file "disk#1.info" and the signature information file "disk#1.sig" with the new merge management information file "new.info" and the signature information file "new.sig", and updates the file names to the original file names (step S107).

Next, the virtual file system 423 reconstructs the virtual package with use of the updated merge management information (step S108), and the Java application 601 shows the "Title#2" title in the reconstructed virtual package in accordance with a user operation (step S109).

Also, if the result of the judgment in step S102 by the virtual file system 423 is that construction is not possible (step S103: N), the virtual file system 423 transmits an update request refusal notification to the Java application 601 (step S110), and repeats the processing from step S101 onward.

Note that in FIG. 19, after the virtual package construction request is transmitted to the virtual file system 423 from the Java application 601, if a title switch occurs while the virtual file system 423 is performing virtual package construction judgment processing (in FIG. 19, "preparing to update"), the virtual file system 423 performs virtual package construction judgment processing again while the title is being played back, and updates the virtual package at the timing of the next title switch.

Supplementary Remark

Although the above describes the playback apparatus pertaining to the present invention according to the embodiment and the variations, of course the present invention is not limited to the playback apparatus described in the above embodiment and variations, and modifications such as the following are also possible.

(1) In the description of insertion-before-playback control processing shown in FIG. 10, if the construction judgment processing result of the virtual package of step S33 is that construction is possible (step S34: Y), the virtual package is constructed. However, in the present variation, if the judgment result of step S33 is that construction is possible, the user is caused to select whether to perform playback with use of the virtual package.

In this case, if the virtual package construction judgment processing result is that the virtual package can be constructed, in addition to the above functions, the virtual file system 423 transmits information indicating that result to the detection module 608.

Figure 23:
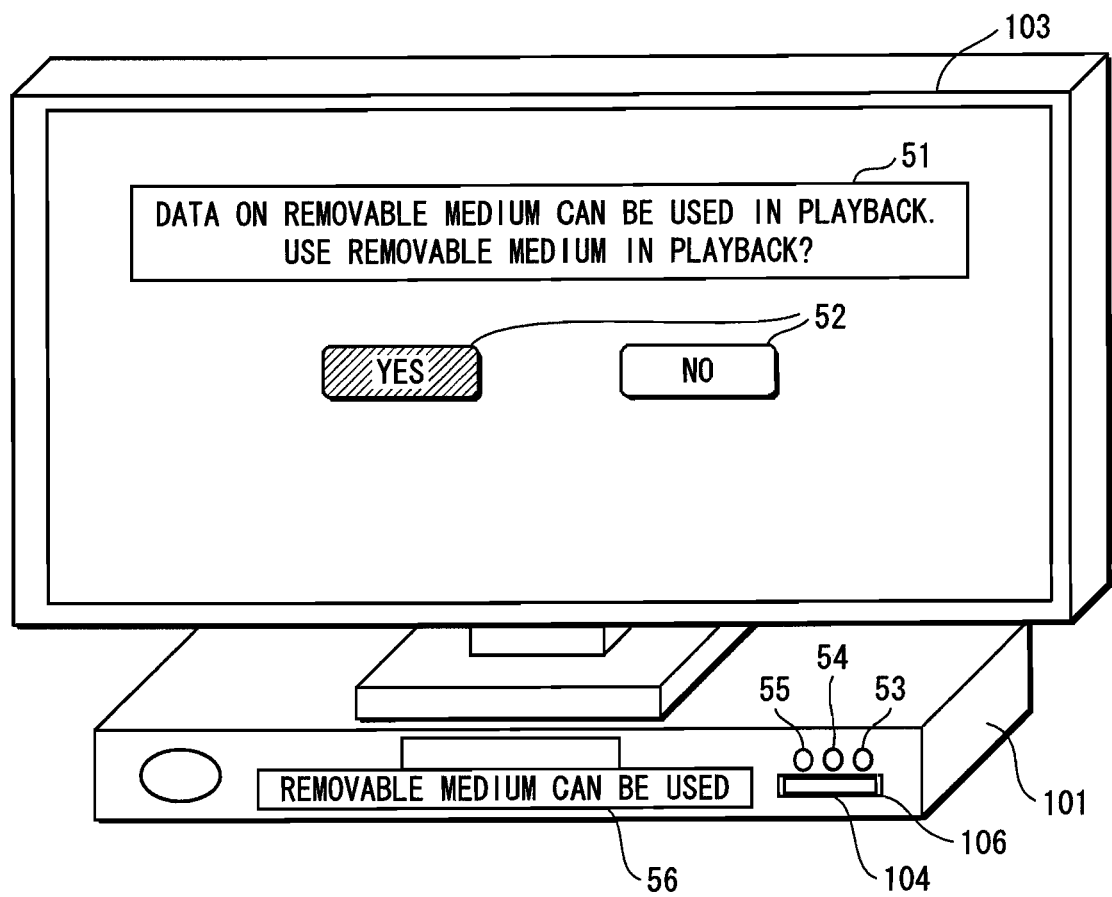
FIG. 23 shows an exemplary playback selection image that is displayed during the insertion-before-playback control processing in the variations.

The detection module 608, in addition to the above functions, receives information indicating that the virtual package can be constructed from the virtual file system 423, and generates a playback selection image for receiving, from the user, a selection of whether to play back the virtual package, for example as shown in the images 51 and 52 of FIG. 23, and displays the playback selection image on the display 103.

Figure 22:
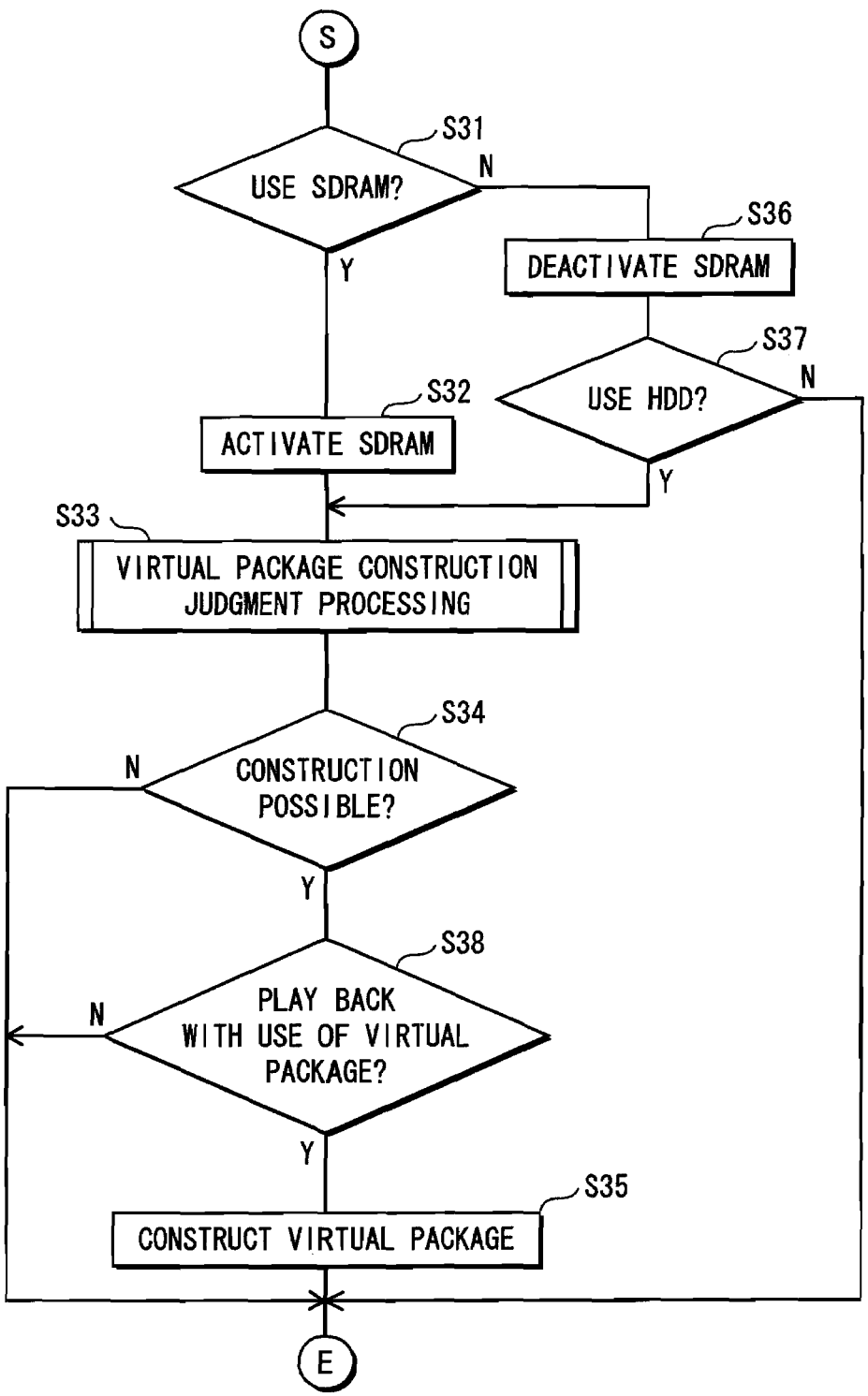
FIG. 22 is an operation flow of insertion-before-playback control processing pertaining to the variations.

FIG. 22 shows an operation flow of the present variation. The following describes processing that is different from the insertion-before-playback control processing described above with reference to FIG. 22.

In FIG. 22, the processing from step S31 to step S34 is similar to the insertion-before-playback processing described above.

In step S34, if the judgment result of step S33 is that construction is possible, the virtual file system 423 transmits information indicating that the virtual package can be constructed to the detection module 608. The detection module 608 receives the information indicating that the virtual package can be constructed, generates the playback selection image, displays the playback selection image on the display 103, and receives a selection of whether to play back the virtual package from the user (step S38).

In step S38, if the virtual file system 423 receives an operation on the remote control 102 indicating that the virtual package is to be played back from the dispatcher 417 via the UO detection module 415 (step S38: Y), the virtual file system 423 constructs the virtual package with use of the additional content on the SDRAM 104 and the merge management information (step S35).

Also, in step S38, if the virtual file system 423 receives an operation indicating that the virtual package is not to be played back from the dispatcher 417 via the UO detection module 415 (step S38: N), the virtual file system 423 ends the processing.

Note that similarly to FIG. 12 described above, if the display 56 is provided in the playback apparatus 101, information indicating that the SDRAM 104 can be used when playing back the virtual package may be displayed on the display 56.

Also, after the detection module 608 displays the playback selection image, if the user has not performed a selection operation in a predetermined time period, the virtual file system 423 may perform playback of the virtual package with use of the SDRAM 104, or may begin playing back the BD-ROM 105 without using the SDRAM 104.

(2) In the above description of insertion-during-playback control processing with reference to FIG. 14, if the SDRAM 104 is inserted during playback of the BD package, a selection is received of whether to use the inserted SDRAM 104 when playing back the BD package, and a virtual package construction judgment is performed if a selection to use the SDRAM 104 is received. However, if the SDRAM 104 is inserted during playback of the BD package and the virtual package construction judgment is performed, SDRAM activation may be performed in accordance with the result of the virtual package construction judgment and the selection by the user to use the inserted SDRAM.

The following describes the operation of the present variation.

Figure 24:
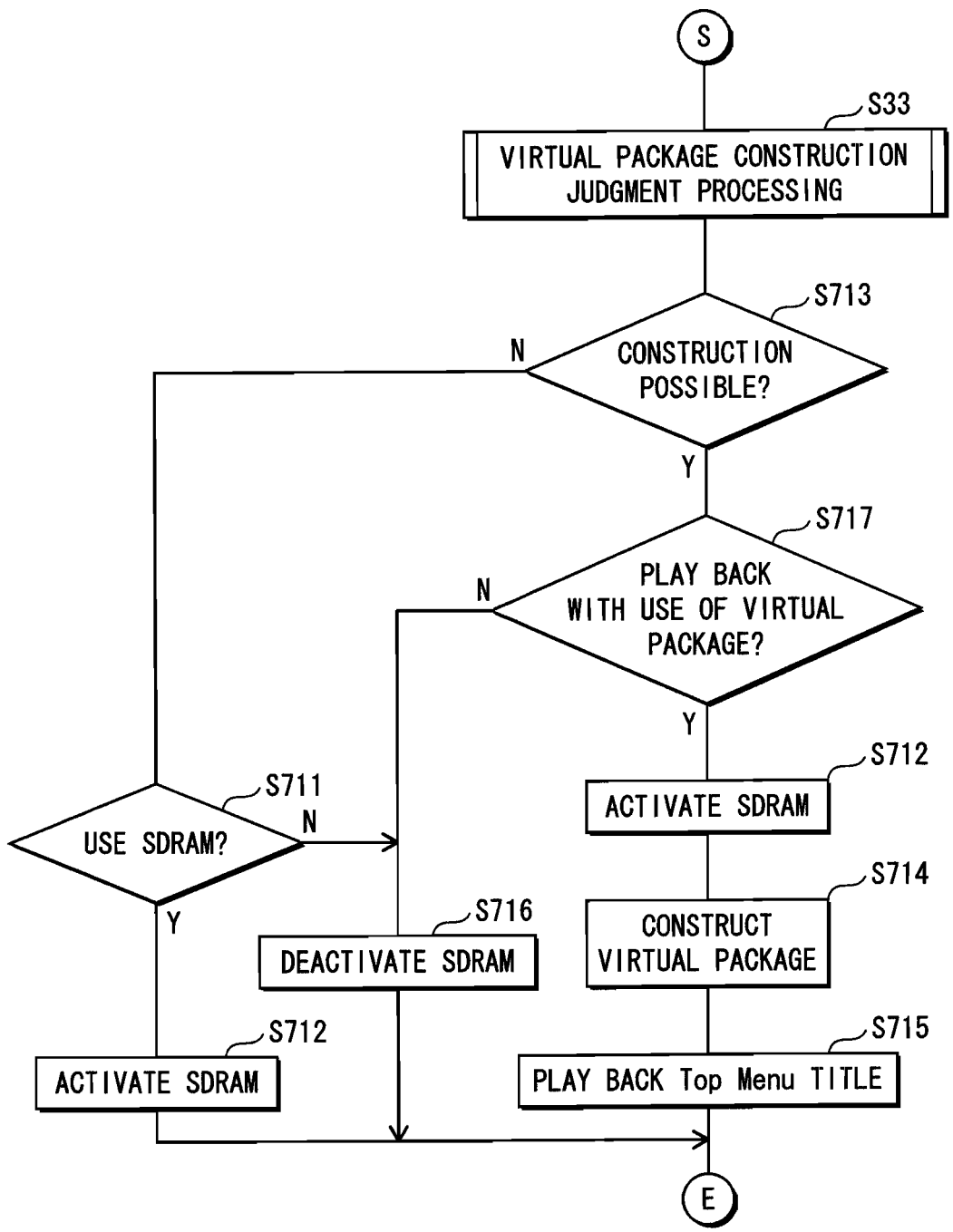
FIG. 24 shows an operation flow of insertion-during-playback control processing in a variation.

FIG. 24 shows the operation flow of the present variation.

If the detection module 608 has detected that the SDRAM 104 is inserted (step S60: Y of FIG. 9), in step S33 of FIG. 22, the virtual file system 423 performs virtual package construction judgment processing.

If the result of the judgment of step S33 is that construction is possible (step S713: Y), the virtual file system 423 transmits information to the detection module 608 indicating that construction is possible. The detection module 608 receives information indicating that the construction is possible from the virtual file system 423, generates the playback selection image and displays the image on the display 103, and receives a selection from the user of whether to play back the virtual package (step S717).

In step S717, if the virtual file system 423 receives a selection by the user to play back the virtual package (step S717), the virtual file system 423 activates the SDRAM 104 (step S712) and performs the processing of steps S714 and S715 described above.

Also, if the judgment result of step S33 is that construction is not possible (step S713: N), the virtual file system 423 transmits information indicating that construction is not possible to the detection module 608. The detection module 608 receives the information indicating that construction is not possible from the virtual file system 423, generates a media selection image and displays the media selection image on the display 103, and receives a selection of whether to use the SDRAM 104 when playing back the BD package (step S711).

If the virtual file system receives a selection to use the SDRAM 104 from the user in step S711 (step S711: Y), the virtual file system 423 activates the SDRAM 104 (step S712), and continues the current playback.

Also, if a selection not to use the SDRAM 104 is received from the user in step S711 (step S711: N) and a selection is received from the user not to play back with use of the virtual package in step S717 (step S717: N), the virtual file system 423 continues the current playback without activating the SDRAM 104.

(3) In the above description of insertion-during-playback control processing with reference to FIG. 18, if the virtual package can be constructed, the virtual package is constructed and the next title to be played back is played back at the time the title switch occurs.

However, if the virtual package can be constructed, the virtual package may also be played back immediately according to a confirmation by the user.

Figure 25:
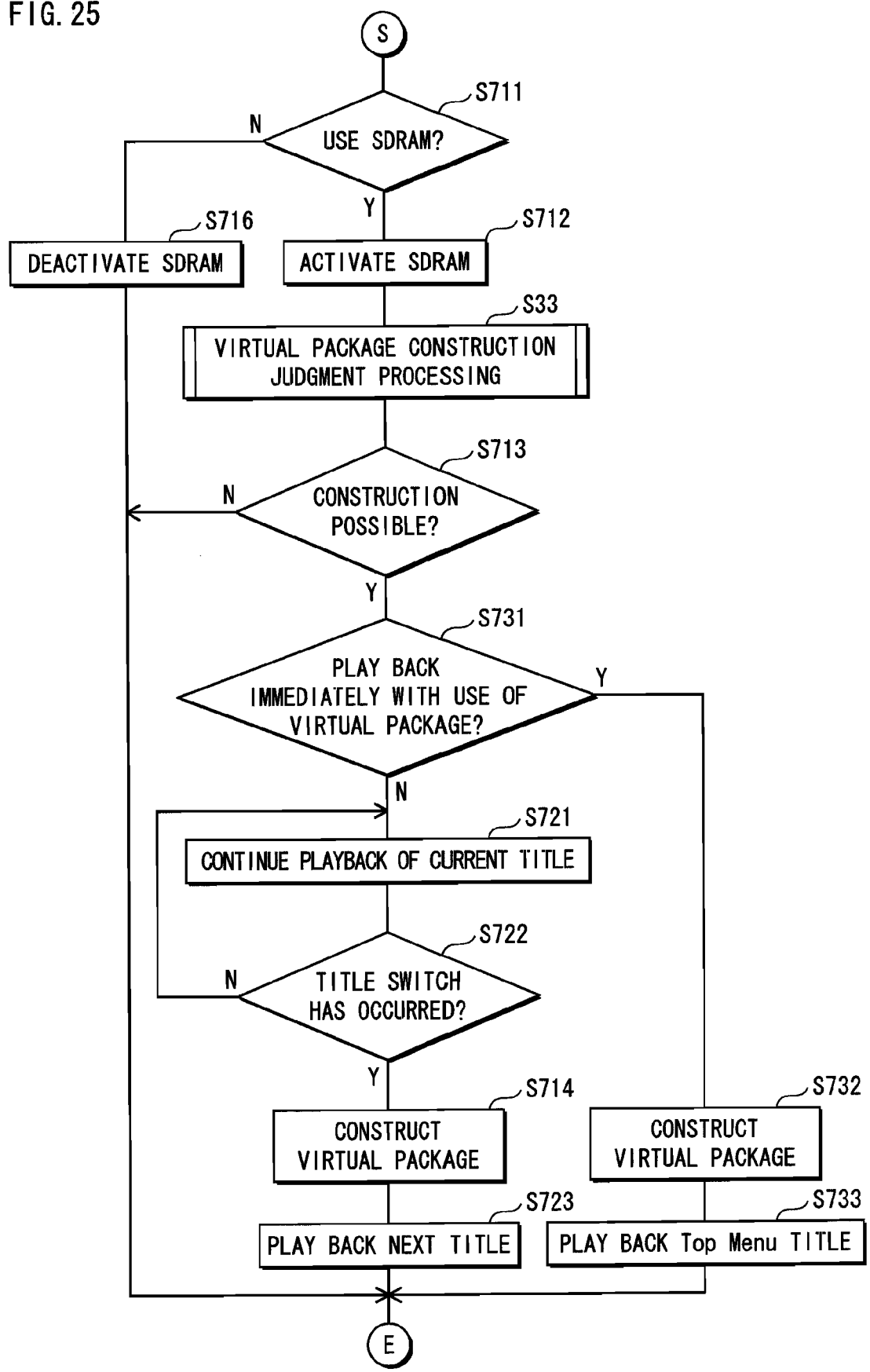
FIG. 25 shows a variant operation flow of insertion-during-playback control processing pertaining to variation 1.

FIG. 25 shows an operation flow of this case.

Processing that differs from FIG. 18 is shown in steps S731 to S733 of FIG. 25, and the following describes such processing.

In step S33 of FIG. 25, when the virtual file system 423 judges that the virtual package can be constructed and transmits information indicating that construction is possible to the detection module 608 (step S713: Y), the detection module 608 generates an image for causing the user to select whether to play back the virtual package immediately, displays the image on the display 103, and receives the selection from the user (step S731).

In step S731, if the virtual file system 423 receives a selection from the dispatcher 417 not to play back the virtual package immediately (step S731: N), processing is performed from step S721 onward.

Also, in step S731, if the virtual file system 423 receives a selection from the dispatcher 417 to play back the virtual package immediately (step S731: Y), the virtual file system 423 constructs the virtual package with use of the BD-ROM 105 and the SDRAM 104 (step S732) and starts playback of the "Top Menu" title in the virtual package (step S733).

(4) Although in the above description of insertion-during-playback control processing and removal-during-playback control processing of the embodiment and variations, the "Top Menu" title of the virtual package is played back after constructing the virtual package, the "First Play" title may be played back instead, or playback may be performed from the beginning of the title being played back before the virtual package is constructed.

(5) Although there is one insertion slot for removable media such as SDRAM in the above description of insertion-before-playback control processing in the embodiment, a plurality of insertion slots may be provided in the playback apparatus.

Figure 26:
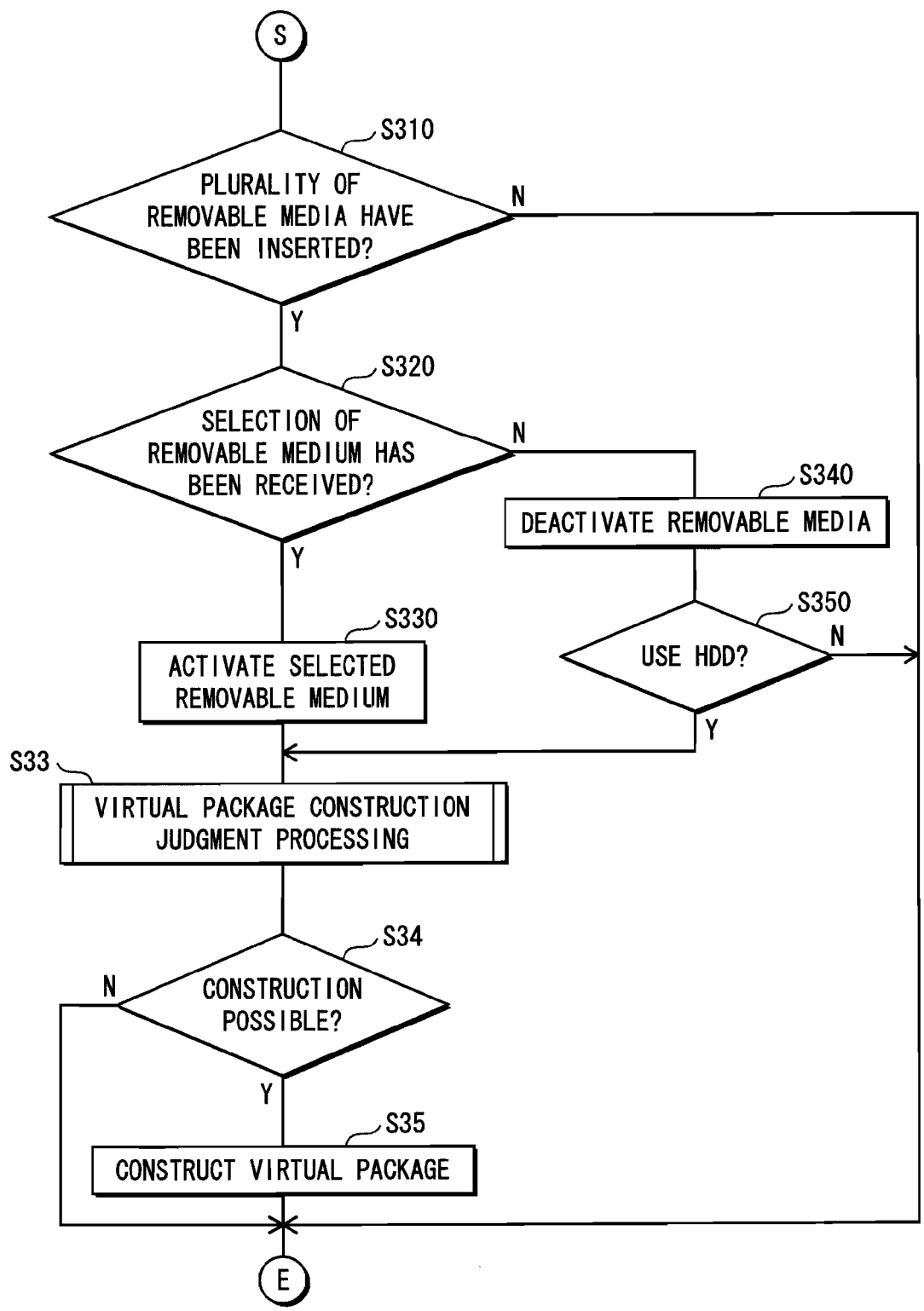
FIG. 26 shows an operation flow when there are a plurality of insertion slots in the playback apparatus of the embodiment.

The following describes a case in which the playback apparatus 101 has a plurality of insertion slots, with reference to FIGS. 9 and 26.

FIG. 26 shows an operation flow of insertion-before-playback control processing when there are a plurality of insertion slots in the playback apparatus. Note that the same reference notations are used for processing that is similar to the embodiment, and description thereof is omitted.

In FIG. 9, the BD-ROM 105 is inserted by the user in step S10, and in step S20, the detection module 608 judges that the removable medium is inserted (step S20), and in such a case, in step S310 of FIG. 26, the detection module 608 detects whether a plurality of removable media have been inserted.

In step S310, if the detection module 608 has detected that a plurality of removable media have been inserted (step S310: Y), an image is generated for receiving a selection of media from the user to use when playing back the BD-ROM 105, the image is displayed on the display 103, and the selection is received from the user (step S320).

If a selection of removable media has been received from the user in step S320 (step S320: Y), information indicating that the selected removable medium has been activated is stored in the memory (step S330), and processing from step S33 onward is performed on the removable medium.

Also, in step S320, if a selection of removable media is not received from the user, and the HDD 422 is selected (step S320: N, step S350: Y), all of the removable media are deactivated (step S340), and processing is performed on the HDD 422 from step S33 onward.

Also, if the HDD 422 is selected in step S320 (step S320: N, step S36: N), all of the removable media are deactivated (step S340), and playback of the BD-ROM 105 is started (step S40 of FIG. 9).

In step S310, if the detection module 608 has detected that the removable media is not inserted (step S310: N), the processing from step S340 onward is performed.

Note that in step S310, if the detection module 608 has detected that removable media are not inserted (step S310: N), after all of the removable media are deactivated (step S340), the processing from step S33 on may be performed without inquiring of the user whether to play back the virtual package with use of the HDD 422.

Figure 27:
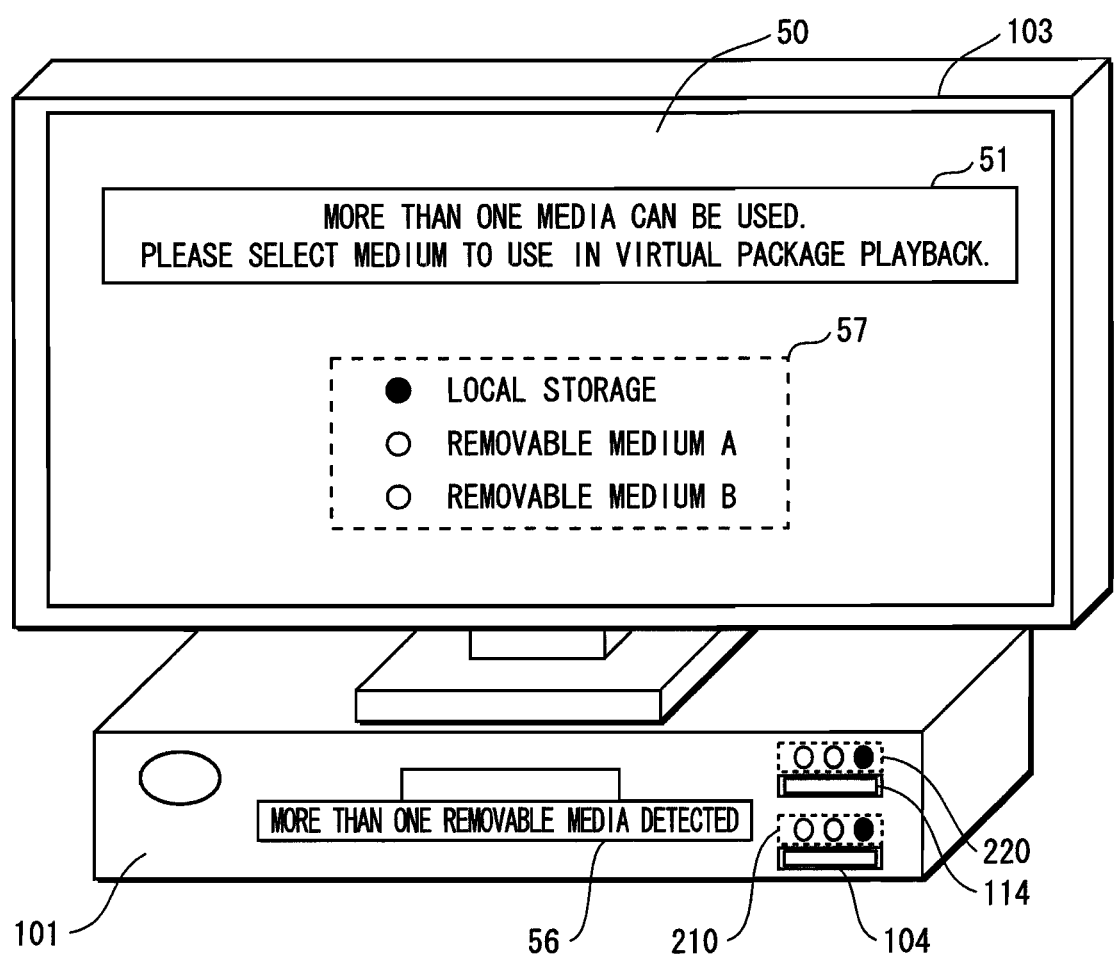
FIG. 27 is an exemplary display of an image for receiving a selection of media from a user when there is a plurality of insertion slots.
Figure 28:
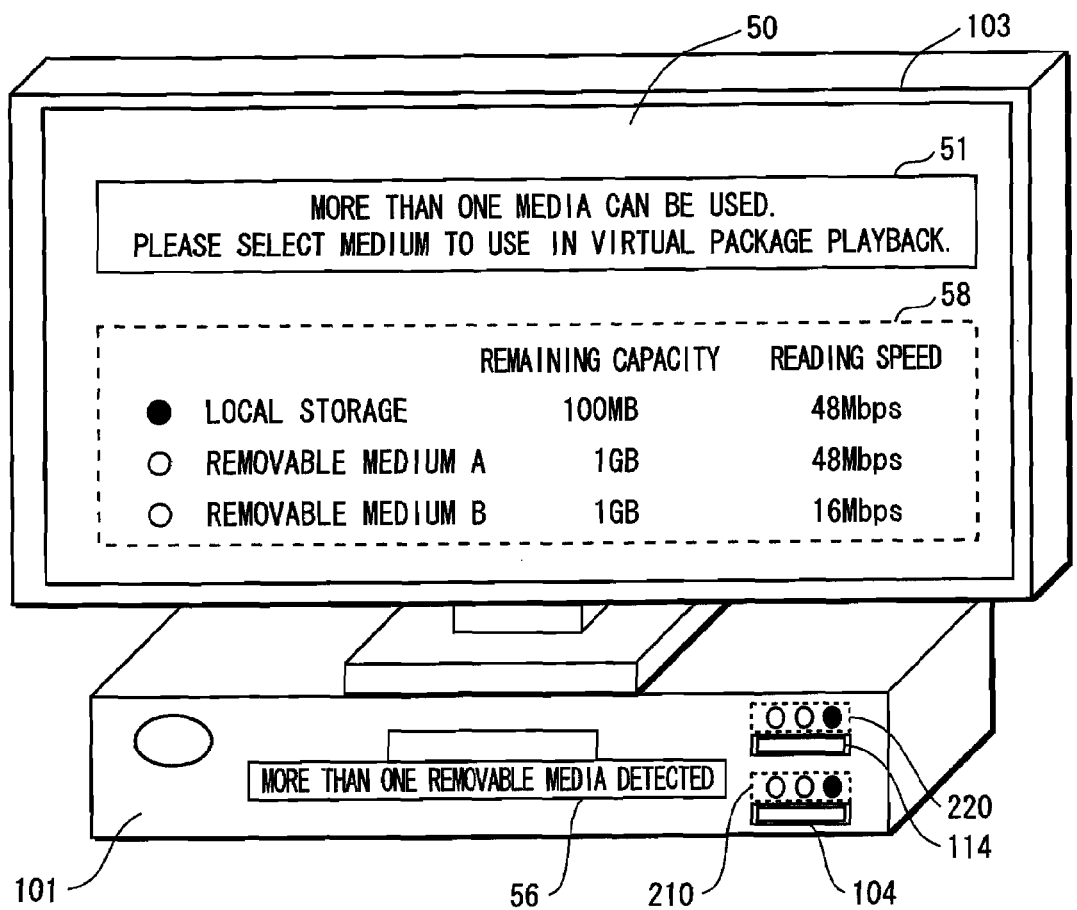
FIG. 28 is an exemplary display of an image for receiving a selection of media from a user when there is a plurality of insertion slots.

FIGS. 27 and 28 are exemplary displays of images for receiving a selection of media from the user in step S320 when there is a plurality of insertion slots.

As shown in FIG. 27, when the SDRAM 104 and a removable medium 114, such as an SDRAM, are both inserted, the detection module 608 displays images 51 and 57 for causing the user to select which medium to use on the display 103, and the user selects between the media displayed in the image 57, including the HDD 422, by operating the remote control 102.

Also, similarly to FIG. 12 described above, the detection module 608 may display information indicating that a plurality of removable media has been detected on the display 56 of the playback apparatus 101, or if a lamp 210 is provided for indicating the status of each of the removable media, each status may be reported to the user by causing the lamps 210 to light up.

Also, in addition to the names of the media shown in the image 57 of FIG. 27, as shown in image 58 of FIG. 28, information to aid the user in selecting media, such as the remaining capacity, reading speed, etc. of the HDD 422 and the inserted removable media may be displayed in correspondence with the names of the media.

Furthermore, for example, media information may be visually emphasized by highlighting, underlining, etc. to recommend a certain medium to the user on the basis of having the largest remaining capacity, the fastest reading speed, etc.

Note that if a plurality of removable media have been inserted, priority conditions may be preset by the user, such as prioritizing a specific slot, prioritizing the media having the largest remaining capacity, or prioritizing the media having the fastest reading speed, or the priority conditions may be preset in the playback apparatus 101 as default settings.

When the priority conditions have been set in this way, the virtual file system 423 may select a medium that matches the priority condition that has been preset instead of performing the processing of step S320.

(6) In the above description of the embodiment and variations, if the detection lamp 53, the activation lamp 54, and the virtual package use lamp 55 are provided in the playback apparatus 101, the lamps are lit in correspondence to each status. However, only one lamp may be used to report all of the statuses. For example, the different statuses may be expressed by varying the color or the flickering speed of the light in accordance with each status.

Also, although in the above description of the embodiment and variations, a lamp such as a LED is used, the statuses may also be displayed with use of the display 56 of the playback apparatus 101 or another display device, or the status may be reported by a voice.

(7) Although in the above description of the embodiment and variations, information indicating that the SDRAM 104 is inserted or removed is displayed on both the display 103 and the display 56 of the playback apparatus 101 when the SDRAM 104 is inserted or removed, the information may be displayed on only one of the displays.

Also, in the above description, during playback of the virtual package with use of the SDRAM 104, the fact that the SDRAM 104 is being used is displayed on the display 56 of the playback apparatus 101, and use of the virtual package is reported by lighting up the lamp 55. However, instead it may be made physically impossible to remove the SDRAM 104 from the insertion slot 106 while the SDRAM 104 is being used.

(8) Also, in the description of the above embodiment and variations, an image is displayed for receiving, from the user, a selection of whether to play back the virtual package, and a selection of whether to continue playing back the virtual package if the SDRAM 104 has been removed during playback of the virtual package with use of the SDRAM 104, and playback control of the virtual package is performed according to the selections of the user. However, if the SDRAM 104 is inserted before or during playback of the BD-ROM 105, playback with use of the virtual package is prioritized, and if the SDRAM 104 has been removed during playback of the virtual package, settings that cause the playback of the BD-ROM 105 to start again from the beginning may be preset in the playback apparatus 101, for example, ending the current playback and playing back the "Top Menu" of the BD-ROM 105.

(9) Also, if the SDRAM 104 is inserted while the virtual package is being played back with use of the additional content on the HDD 422, etc., and the virtual file system 423 has activated the SDRAM 104, regardless of the virtual package construction judgment processing result, playback of the BD-ROM 105 may be restarted by deactivating the HDD 422, displaying the "Top Menu" of the BD-ROM 105, etc.

(10) Although in the description of the above embodiment and variation, Java (registered trademark) is used as the programming language of the virtual machine, another programming language may be used, such as B-Shell, Perl Script, or ECMAScript used in UNIX (registered trademark) OS, etc.

Also, although the above embodiment describes the playback apparatus as playing back a BD-ROM, the effects described above can also be achieved when the necessary data on the BD-ROM 105 used in the present embodiment is instead recorded on a writable optical recording medium.

(11) The present invention may be realized as methods that include the steps described in the above embodiment. Also, the present invention may be realized as a computer program for causing a computer to operate by the methods with use of a computer system. Also, the present invention may be realized as digital signals representing the computer program. Also, the present invention may be realized as a computer-readable recording medium (for example, a flexible disk, a hard disk, CD, MO, DVD, BD, or a semiconductor memory) containing the above computer program or digital signals recorded thereon. Also, the present invention may be realized as the computer program or the digital signals recorded on the computer-readable recording medium.

Also, the computer program or the digital signals as the present invention may be transferred via telecommunication lines, radio communications, communication lines, or a network such as the Internet.

Also, the computer program or the digital signals may be transferred to another computer system by means of the computer-readable recording medium recording them, the network or the like so that the other computer system can operate in the same manner.

INDUSTRIAL APPLICABILITY

A playback apparatus of the present invention includes an insertion slot for a removable medium such as an SD memory card, and can be used as a playback apparatus that plays back video content that has been recorded on an optical disk such as a BD-ROM.

The invention claimed is:

1. A playback apparatus that plays back video data using basic information for controlling a playback of the video data, from a first recording medium on which the video data and the basic information are recorded, the playback apparatus comprising:

a non-transitory recording medium;
an interface into which a second recording medium can be inserted and from which the second recording medium can be removed;
a detection unit operable to detect that the second recording medium is inserted into the interface; and
a playback control unit operable to control the playback of the video data,
wherein, when the detection unit detects that the second recording medium is inserted into the interface during the playback of the video data recorded on the first recording medium using the basic information, and when supplementary information for controlling the playback of the video data is recorded on the second recording medium, the playback control unit judges whether the supplementary information is associated with the basic information,
wherein, when the supplementary information is judged to be associated with the basic information, the playback control unit changes an attribute of the supplementary information to read-only, and performs signature verification on the supplementary information using certificate data recorded on the first recording medium and using signature information recorded on the second recording medium,
wherein, when the supplementary information is judged to be authentic as a result of the signature verification, after the playback control unit stops the playback of the video data using the basic information, the playback control unit performs control to play back the video data using the basic information on the first recording medium and the supplementary information on the second recording medium,
wherein the detection unit is stored in the non-transitory recording medium as a detection program, and
wherein the playback apparatus reads and executes the detection program stored in the non-transitory recording medium.

2. The playback apparatus of claim 1, further comprising:
a reception unit operable to receive a selection, from a user, indicating whether to use the supplementary information on the second recording medium when playing back the video data, when the detection unit detects that the second recording medium is inserted into the interface, when the supplementary information is judged to be associated with the basic information, and when the supplementary information is judged to be authentic as the result of the signature verification,
wherein the playback control unit performs control to play back the video data using the supplementary information on the second recording medium, only when the reception unit receives the selection to use the supplementary information on the second recording medium,
wherein the reception unit is stored in the non-transitory recording medium as a reception program, and
wherein the playback apparatus reads and executes the reception program stored in the non-transitory recording medium.

3. The playback apparatus of claim 2,
wherein, when the detection unit detects that the second recording medium is inserted into the interface during the playback of the video data and the reception unit receives the selection to use the supplementary information on the second recording medium:
(i) when the supplementary information is judged to be associated with the basic information, and when the supplementary information is judged to be authentic as the result of the signature verification, after the playback control unit stops the playback of the video data using the basic information, the playback control unit performs control to play back the video data using the supplementary information on the second recording medium;

(ii) when the supplementary information is judged not to be associated with the basic information, the playback control unit performs control to continue the playback of the video data using the basic information; and (iii) when the supplementary information is judged not to be authentic as the result of the signature verification, the playback control unit performs control to continue the playback of the video data using the basic information.

4. The playback apparatus of claim 2,
wherein, when the detection unit detects that the second recording medium is inserted into the interface during the playback of the video data and the reception unit receives the selection to use the supplementary information on the second recording medium:
 (i) the playback control unit performs control to continue the playback of the video data using the basic information; and
 (ii) the playback control unit performs control to play back the video data using the supplementary information on the second recording medium at a predetermined timing during playback, only when the supplementary information is judged to be associated with the basic information, and the supplementary information is judged to be authentic as the result of the signature verification.

5. The playback apparatus of claim 2, further comprising:
a reporting unit operable to turn on or to turn off a lamp to report information indicating whether control can be performed to play back the video data using the supplementary information on the second recording medium, in accordance with a result of the judgment of whether the supplementary information is associated with the basic information and the result of the signature verification,
wherein the reporting unit is stored in the non-transitory recording medium as a reporting program, and
wherein the playback apparatus reads and executes the reporting program stored on the non-transitory recording medium.

6. The playback apparatus of claim 1,
wherein the detection unit is further operable to detect that the second recording medium has been removed from the interface when the second recording medium has been removed from the interface, and to generate an image including a message to report that the second recording medium has been removed from the interface,
wherein, when the detection unit detects that the second recording medium has been removed while the playback control unit is performing control to play back the video data using the supplementary information on the second recording medium, the playback control unit performs control to stop playing back the video data, and
wherein, when the detection unit detects that the second recording medium has been removed while the playback control unit is performing control to play back the video data without using the supplementary information on the second recording medium, the playback control unit deactivates the second recording medium and performs control to continue the playback of the video data using the basic information.

7. The playback apparatus of claim 6,
wherein a reception unit of the playback apparatus receives an instruction indicating whether to use the supplementary information on the second recording medium when playing back the video data, when the detection unit detects that the second recording medium has been removed from the interface during the playback of the video data using the supplementary information, and when the detection unit generates the image including the message,
wherein the playback control unit is further operable to perform control to restart the playback of the video data using the supplementary information on the second recording medium, when the reception unit receives an instruction to use the supplementary information on the second recording medium when playing back the video data,
wherein, when the reception unit receives an instruction not to use the supplementary information on the second recording medium when playing back the video data, the playback control unit performs control to stop playing back the video data using the supplementary information on the second recording medium,
wherein the reception unit is stored in the non-transitory recording medium as a reception program, and
wherein the playback apparatus reads and executes the reception program stored in the non-transitory recording medium.

8. The playback apparatus of claim 6,
wherein, after the detection unit detects that the second recording medium has been removed:
 (i) when the detection unit does not detect that the second recording medium has been inserted into the interface again in a predetermined time period, the playback control unit performs control to stop playing back the video data using the supplementary information on the second recording medium; and
 (ii) when the detection unit detects that the second recording medium has been inserted into the interface again in the predetermined time period, the playback control unit performs control to restart the playback of the video data using the supplementary information on the second recording medium.

9. The playback apparatus of claim 1,
wherein the detection unit is further operable to detect whether a third recording medium is inserted into the interface, the third recording medium being a different from the second recording medium and having supplementary information for controlling playback of video data recorded thereon,
wherein the playback apparatus further comprises:
 a reception unit operable to receive an instruction from a user indicating a selection of one of the third recording medium and the second recording medium, as a selected recording medium, when the detection unit detects that the second recording medium and the third recording medium are inserted into the interface,
wherein the playback control unit judges whether the supplementary information on the selected recording medium is associated with the basic information,
wherein, when the supplementary information on the selected recording medium is judged to be associated with the basic information, the playback control unit changes an attribute of the supplementary information on the selected recording medium to read-only, performs signature verification of the supplementary information on the selected recording medium using the certificate data recorded on the first recording medium and signature information recorded on the selected recording medium, and when the supplementary information is judged to be authentic as a result of the signature verification, after the playback control unit stops the playback of the video data using the basic information, the playback control unit performs control to play back the video data using the basic information on the first recording medium and the supplementary information on the selected recording medium, wherein the reception unit is stored in the non-transitory recording medium as a reception program, and wherein the playback apparatus reads and executes the reception program stored on the non-transitory recording medium.

10. The playback apparatus of claim 9, wherein the playback control unit is further operable to perform control to play back the video data using the basic information on the first recording medium and the supplementary information on the third recording medium while the third recording medium is inserted into the interface and the second recording medium is not inserted into the interface, wherein, while the playback control unit is performing the control to play back the video data using the supplementary information on the third recording medium, and when the detection unit detects that the second recording medium is inserted into the interface and the reception unit receives a selection of the second recording medium, the playback control unit performs control to (i) stop playing back the video data using the supplementary information on the third recording medium, and (ii) play back the video data using the basic information on the first recording medium and the supplementary information on the second recording medium, only when the supplementary information on the second recording medium is associated with the basic information and the supplementary information on the second recording medium is judged to be authentic as the result of the signature verification, wherein, when the supplementary information on the second recording medium is judged not to be associated with the basic information, the playback control unit performs control to continue playback of the video data using the basic information on the first recording medium and the supplementary information on the third recording medium, and wherein, when the supplementary information on the second recording medium is judged not to be authentic, the playback control unit performs control to continue playback of the video data using the basic information on the first recording medium and the supplementary information on the third recording medium.

11. The playback apparatus of claim 9, wherein the playback control unit is further operable to perform control to play back the video data using the basic information on the first recording medium and the supplementary information on the third recording medium while the third recording medium is inserted into the interface and the second recording medium is not inserted into the interface, wherein, while the playback control unit is performing control to play back the video data using the supplementary information on the third recording medium, and when the detection unit detects that the second recording medium is inserted into the interface and the reception unit receives a selection of the second recording medium, the playback control unit performs control to play back the video data using the basic information on the first recording medium and the supplementary information on the second recording medium at a predetermined timing, wherein, when the supplementary information on the second recording medium is judged not to be associated with the basic information, the playback control unit performs control to continue the playback of the video data using the basic information on the first recording medium and the supplementary information on the third recording medium, and wherein, when the supplementary information is judged not to be authentic, the playback control unit performs control to continue the playback of the video data using the basic information on the first recording medium and the supplementary information on the third recording medium.

12. The playback apparatus of claim 1, further comprising a virtual file system unit operable to generate virtual package information by merging directories and files on the first recording medium and on the second recording medium, wherein, when the supplementary information is judged to be authentic as a result of the signature verification, after the playback control unit stops the playback of the video data using the basic information, the virtual file system unit generates the virtual package information, such that the playback control unit performs control to play back the video data using the basic information on the first recording medium and the supplementary information on the second recording medium via the generated virtual package information.

13. A non-transitory computer-readable recording medium recording a control program that is readable and executable by a playback apparatus that plays back video data using basic information for controlling a playback of the video data, from a first recording medium on which the video data and the basic information are recorded, the playback apparatus including an interface into which a second recording medium can be inserted and from which the second recording medium can be removed, the control program causing the playback apparatus to execute a method comprising:

a detection step of detecting that the second recording medium is inserted into the interface; and a playback control step, wherein, when the detection step detects that the second recording medium is inserted into the interface during the playback of the video data recorded on the first recording medium using the basic information, and when supplementary information for controlling the playback of the video data has been recorded on the second recording medium, the playback control step judges whether the supplementary information is associated with the basic information, wherein, when the supplementary information is judged to be associated with the basic information, the playback control step changes an attribute of the supplementary information to read-only, and performs signature verification of the supplementary information using certificate data recorded on the first recording medium and using signature information recorded on the second recording medium, and wherein, when the supplementary information is judged to be authentic as a result of the signature verification, after the playback control step stops the playback of the video data using the basic information, the playback control step performs control to play back the video data using the basic information on the first recording medium and the supplementary information on the second recording medium.

* * * * *